United States Patent
Murray et al.

(10) Patent No.: US 12,358,140 B2
(45) Date of Patent: Jul. 15, 2025

(54) MOTION PLANNING FOR MULTIPLE ROBOTS IN SHARED WORKSPACE

(71) Applicant: REALTIME ROBOTICS, INC., Boston, MA (US)

(72) Inventors: Sean Murray, Cambridge, MA (US); William Floyd-Jones, Boston, MA (US); Xianchao Long, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 858 days.

(21) Appl. No.: 16/909,096

(22) Filed: Jun. 23, 2020

(65) Prior Publication Data

US 2020/0398428 A1    Dec. 24, 2020

Related U.S. Application Data

(60) Provisional application No. 62/865,431, filed on Jun. 24, 2019.

(51) Int. Cl.
*B25J 9/16*    (2006.01)

(52) U.S. Cl.
CPC .......... *B25J 9/1666* (2013.01); *B25J 9/1605* (2013.01); *B25J 9/1682* (2013.01);
(Continued)

(58) Field of Classification Search
CPC ...... B25J 9/1666; B25J 9/1605; B25J 9/1682; B25J 9/0087; B25J 9/1676;
(Continued)

(56) References Cited

U.S. PATENT DOCUMENTS

| 4,163,183 | A | 7/1979 | Dunne et al. |
| 4,300,198 | A | 11/1981 | Davini |

(Continued)

FOREIGN PATENT DOCUMENTS

| CA | 3071332 A1 | 1/2019 |
| CN | 101837591 A | 9/2010 |

(Continued)

OTHER PUBLICATIONS

Non-Final Office Action Issued in U.S. Appl. No. 16/268,290, Mailed Date: Jun. 17, 2021, 35 pages.

(Continued)

*Primary Examiner* — Abby Y Lin
*Assistant Examiner* — Karston G. Evans
(74) *Attorney, Agent, or Firm* — Cozen O'Connor

(57) ABSTRACT

Collision detection useful in motion planning for robotics advantageously represents planned motions of each of a plurality of robots as obstacles when performing motion planning for any given robot in the plurality of robots that operate in a shared workspace, including taking into account the planned motions during collision assessment. Edges of a motion planning graph are assigned cost values, based at least in part on the collision assessment. Obstacles may be pruned as corresponding motions are completed. Motion planning requests may be queued, and some robots skipped, for example in response to an error or blocked condition.

21 Claims, 7 Drawing Sheets

(52) U.S. Cl.
CPC ............ *G05B 2219/35148* (2013.01); *G05B 2219/40446* (2013.01); *G05B 2219/40475* (2013.01); *G05B 2219/40512* (2013.01)

(58) Field of Classification Search
CPC ........... G05B 2219/35148; G05B 2219/40446; G05B 2219/40475; G05B 2219/40512; G05B 2219/39082; G05B 2219/39135; G05B 2219/40476
See application file for complete search history.

(56) References Cited

U.S. PATENT DOCUMENTS

| | | |
|---|---|---|
| 4,763,276 A | 8/1988 | Perreirra et al. |
| 4,862,373 A | 8/1989 | Meng |
| 4,890,241 A | 12/1989 | Hoffman et al. |
| 4,949,277 A | 8/1990 | Trovato et al. |
| 5,177,563 A | 1/1993 | Everett et al. |
| 5,297,238 A | 3/1994 | Wang et al. |
| 5,347,459 A | 9/1994 | Greenspan et al. |
| 5,544,282 A | 8/1996 | Chen et al. |
| 5,727,132 A | 3/1998 | Arimatsu et al. |
| 6,004,016 A | 12/1999 | Spector |
| 6,049,756 A | 4/2000 | Libby |
| 6,089,742 A | 7/2000 | Warmerdam et al. |
| 6,259,988 B1 | 7/2001 | Galkowski et al. |
| 6,345,213 B1 | 2/2002 | Graeser et al. |
| 6,470,301 B1 | 10/2002 | Barral |
| 6,493,607 B1 | 12/2002 | Bourne et al. |
| 6,526,372 B1 | 2/2003 | Orschel et al. |
| 6,526,373 B1 | 2/2003 | Barral |
| 6,529,852 B2 | 3/2003 | Knoll et al. |
| 6,539,294 B1 | 3/2003 | Kageyama |
| 6,629,037 B1 | 9/2003 | Nyland |
| 6,671,582 B1 | 12/2003 | Hanley |
| 6,836,702 B1 | 12/2004 | Brogaardh et al. |
| 6,907,133 B2 | 6/2005 | Gotoh |
| 6,944,584 B1 | 9/2005 | Tenney et al. |
| 7,493,231 B2 | 2/2009 | Graf |
| 7,577,498 B2 | 8/2009 | Jennings et al. |
| 7,609,020 B2 | 10/2009 | Kniss et al. |
| 7,715,946 B2 | 5/2010 | Watanabe et al. |
| 7,865,277 B1 | 1/2011 | Arson et al. |
| 7,904,202 B2 | 3/2011 | Hoppe |
| 7,940,023 B2 | 5/2011 | Kniss et al. |
| 8,082,064 B2 | 12/2011 | Kay |
| 8,103,085 B1 | 1/2012 | Zadeh |
| 8,111,904 B2 | 2/2012 | Wallack et al. |
| 8,162,584 B2 | 4/2012 | Michael et al. |
| 8,315,738 B2 | 11/2012 | Chang et al. |
| 8,571,706 B2 | 10/2013 | Zhang et al. |
| 8,666,548 B2 | 3/2014 | Lim |
| 8,825,207 B2 | 9/2014 | Kim et al. |
| 8,825,208 B1 | 9/2014 | Benson |
| 8,855,812 B2 | 10/2014 | Kapoor |
| 8,880,216 B2 | 11/2014 | Izumi et al. |
| 8,972,057 B1 | 3/2015 | Freeman et al. |
| 8,989,897 B2 | 3/2015 | De Smet |
| 9,061,421 B2 | 6/2015 | Trompeter |
| 9,092,698 B2 | 7/2015 | Buehler et al. |
| 9,102,055 B1 | 8/2015 | Konolige et al. |
| 9,227,322 B2 | 1/2016 | Graca et al. |
| 9,280,899 B2 | 3/2016 | Biess et al. |
| 9,327,397 B1 | 5/2016 | Williams et al. |
| 9,333,044 B2 | 5/2016 | Olson |
| 9,434,072 B2 | 9/2016 | Buehler et al. |
| 9,539,058 B2 | 1/2017 | Tsekos et al. |
| 9,632,502 B1 | 4/2017 | Levinson et al. |
| 9,645,577 B1 | 5/2017 | Frazzoli et al. |
| 9,659,236 B2 | 5/2017 | Barker et al. |
| 9,687,982 B1 | 6/2017 | Jules et al. |
| 9,687,983 B1 | 6/2017 | Prats |
| 9,701,015 B2 | 7/2017 | Buehler et al. |
| 9,707,682 B1 | 7/2017 | Konolige et al. |
| 9,731,724 B2 | 8/2017 | Yoon |
| 9,981,382 B1 | 5/2018 | Strauss et al. |
| 9,981,383 B1 | 5/2018 | Nagarajan |
| 10,035,266 B1 | 7/2018 | Kroeger |
| 10,099,372 B2 | 10/2018 | Vu et al. |
| 10,124,488 B2 | 11/2018 | Lee et al. |
| 10,131,053 B1 | 11/2018 | Sampedro et al. |
| 10,300,605 B2 | 5/2019 | Sato |
| 10,303,180 B1 | 5/2019 | Prats |
| 10,430,641 B2 | 10/2019 | Gao |
| 10,671,081 B1 | 6/2020 | Prats |
| 10,688,664 B2 | 6/2020 | Kovacs |
| 10,705,528 B2 | 7/2020 | Wierzynski et al. |
| 10,723,024 B2 | 7/2020 | Konidaris et al. |
| 10,782,694 B2 | 9/2020 | Zhang et al. |
| 10,792,114 B2 | 10/2020 | Hashimoto et al. |
| 10,959,795 B2 | 3/2021 | Hashimoto et al. |
| 11,314,254 B2 | 4/2022 | Macias et al. |
| 11,358,337 B2 | 6/2022 | Czinger et al. |
| 11,407,117 B1 | 8/2022 | Hickman |
| 11,623,494 B1 | 4/2023 | Arnicar et al. |
| 11,751,948 B2 | 9/2023 | Gregerson et al. |
| 2002/0013675 A1 | 1/2002 | Knoll et al. |
| 2002/0074964 A1 | 6/2002 | Quaschner et al. |
| 2005/0071048 A1 | 3/2005 | Watanabe et al. |
| 2005/0216181 A1 | 9/2005 | Estkowski et al. |
| 2006/0235610 A1 | 10/2006 | Ariyur et al. |
| 2006/0241813 A1 | 10/2006 | Babu et al. |
| 2006/0247852 A1 | 11/2006 | Kortge et al. |
| 2007/0106422 A1 | 5/2007 | Jennings et al. |
| 2007/0112700 A1 | 5/2007 | Den et al. |
| 2007/0239315 A1 | 10/2007 | Sato et al. |
| 2008/0012517 A1 | 1/2008 | Kniss et al. |
| 2008/0125893 A1 | 5/2008 | Tilove et al. |
| 2008/0186312 A1 | 8/2008 | Ahn et al. |
| 2008/0234864 A1 | 9/2008 | Sugiura et al. |
| 2009/0055024 A1 | 2/2009 | Kay |
| 2009/0192710 A1 | 7/2009 | Eidehall et al. |
| 2009/0234499 A1 | 9/2009 | Nielsen et al. |
| 2009/0326711 A1 | 12/2009 | Chang et al. |
| 2009/0326876 A1 | 12/2009 | Miller |
| 2010/0145516 A1 | 6/2010 | Cedoz et al. |
| 2010/0235033 A1 | 9/2010 | Yamamoto et al. |
| 2011/0036188 A1 | 2/2011 | Fujioka et al. |
| 2011/0066282 A1 | 3/2011 | Bosscher et al. |
| 2011/0153080 A1 | 6/2011 | Shapiro et al. |
| 2011/0222995 A1 | 9/2011 | Irie et al. |
| 2011/0264111 A1 | 10/2011 | Nowlin et al. |
| 2012/0010772 A1 | 1/2012 | Pack et al. |
| 2012/0053728 A1 | 3/2012 | Theodorus et al. |
| 2012/0083964 A1 | 4/2012 | Montemerlo et al. |
| 2012/0215351 A1 | 8/2012 | Mcgee et al. |
| 2012/0297733 A1 | 11/2012 | Pierson et al. |
| 2012/0323357 A1 | 12/2012 | Izumi et al. |
| 2013/0076866 A1 | 3/2013 | Drinkard et al. |
| 2013/0325244 A1 | 12/2013 | Wang et al. |
| 2013/0346348 A1 | 12/2013 | Buehler et al. |
| 2014/0012419 A1 | 1/2014 | Nakajima |
| 2014/0025201 A1 | 1/2014 | Ryu et al. |
| 2014/0025203 A1 | 1/2014 | Inazumi |
| 2014/0058406 A1 | 2/2014 | Tsekos |
| 2014/0067121 A1 | 3/2014 | Brooks et al. |
| 2014/0079524 A1 | 3/2014 | Shimono et al. |
| 2014/0121833 A1 | 5/2014 | Lee et al. |
| 2014/0121837 A1 | 5/2014 | Hashiguchi et al. |
| 2014/0147240 A1 | 5/2014 | Noda et al. |
| 2014/0156068 A1 | 6/2014 | Graca et al. |
| 2014/0249741 A1 | 9/2014 | Levien et al. |
| 2014/0251702 A1 | 9/2014 | Berger et al. |
| 2014/0277718 A1 | 9/2014 | Izhikevich et al. |
| 2014/0305227 A1 | 10/2014 | Johns |
| 2014/0309916 A1 | 10/2014 | Bushnell |
| 2014/0368504 A1 | 12/2014 | Chen et al. |
| 2015/0005785 A1 | 1/2015 | Olson |
| 2015/0037131 A1 | 2/2015 | Girtman et al. |
| 2015/0051783 A1 | 2/2015 | Tamir et al. |
| 2015/0134111 A1 | 5/2015 | Nakajima |
| 2015/0217455 A1 | 8/2015 | Kikkeri et al. |
| 2015/0261899 A1 | 9/2015 | Atohira et al. |
| 2015/0266182 A1 | 9/2015 | Strandberg |

(56) References Cited

U.S. PATENT DOCUMENTS

| | | |
|---|---|---|
| 2016/0001775 A1 | 1/2016 | Wilhelm et al. |
| 2016/0008078 A1 | 1/2016 | Azizian et al. |
| 2016/0016312 A1 | 1/2016 | Lawrence et al. |
| 2016/0059412 A1 | 3/2016 | Oleynik |
| 2016/0107313 A1 | 4/2016 | Hoffmann et al. |
| 2016/0112694 A1 | 4/2016 | Nishi et al. |
| 2016/0121486 A1 | 5/2016 | Lipinski et al. |
| 2016/0121487 A1* | 5/2016 | Mohan ............... B25J 13/085 700/250 |
| 2016/0154408 A1 | 6/2016 | Eade et al. |
| 2016/0161257 A1 | 6/2016 | Simpson et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0001775 A1 | 1/2017 | Cimmerer et al. |
| 2017/0004406 A1 | 1/2017 | Aghamohammadi |
| 2017/0028559 A1* | 2/2017 | Davidi ............... B25J 9/1682 |
| 2017/0120448 A1 | 5/2017 | Lee et al. |
| 2017/0123419 A1 | 5/2017 | Levinson et al. |
| 2017/0132334 A1 | 5/2017 | Levinson et al. |
| 2017/0146999 A1 | 5/2017 | Cherepinsky et al. |
| 2017/0157769 A1 | 6/2017 | Aghamohammadi et al. |
| 2017/0168485 A1 | 6/2017 | Berntorp et al. |
| 2017/0168488 A1 | 6/2017 | Wierzynski et al. |
| 2017/0193830 A1 | 7/2017 | Fragoso et al. |
| 2017/0210008 A1* | 7/2017 | Maeda ............... B25J 9/1666 |
| 2017/0219353 A1 | 8/2017 | Alesiani |
| 2017/0252922 A1 | 9/2017 | Levine et al. |
| 2017/0252924 A1 | 9/2017 | Vijayanarasimhan et al. |
| 2017/0305015 A1 | 10/2017 | Krasny et al. |
| 2017/0315530 A1 | 11/2017 | Godau et al. |
| 2018/0001472 A1 | 1/2018 | Konidaris et al. |
| 2018/0001476 A1* | 1/2018 | Tan ............... B61G 7/04 |
| 2018/0029231 A1 | 2/2018 | Davis |
| 2018/0029233 A1 | 2/2018 | Lager |
| 2018/0032039 A1 | 2/2018 | Huynh et al. |
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1* | 6/2018 | Lalonde ............... G05D 1/0214 |
| 2018/0189683 A1 | 7/2018 | Newman |
| 2018/0222050 A1 | 8/2018 | Vu et al. |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0339456 A1 | 11/2018 | Czinger et al. |
| 2018/0349702 A1 | 12/2018 | Gildert et al. |
| 2019/0015981 A1 | 1/2019 | Yabushita et al. |
| 2019/0039242 A1 | 2/2019 | Fujii et al. |
| 2019/0087976 A1 | 3/2019 | Sugahara et al. |
| 2019/0101930 A1 | 4/2019 | Yadmellat |
| 2019/0105779 A1 | 4/2019 | Einav |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1* | 6/2019 | Taylor ............... G05D 1/0088 |
| 2019/0216555 A1 | 7/2019 | Dimaio et al. |
| 2019/0232496 A1 | 8/2019 | Graichen et al. |
| 2019/0234751 A1 | 8/2019 | Takhirov |
| 2019/0240835 A1 | 8/2019 | Sorin et al. |
| 2019/0262993 A1 | 8/2019 | Cole et al. |
| 2019/0291277 A1 | 9/2019 | Oleynik |
| 2019/0293443 A1 | 9/2019 | Kelly et al. |
| 2019/0391597 A1 | 12/2019 | Dupuis |
| 2020/0030971 A1 | 1/2020 | Oleynik |
| 2020/0069134 A1* | 3/2020 | Ebrahimi Afrouzi ............... G05D 1/0248 |
| 2020/0078097 A1 | 3/2020 | Gregerson et al. |
| 2020/0097014 A1 | 3/2020 | Wang |
| 2020/0215686 A1 | 7/2020 | Vijayanarasimhan et al. |
| 2020/0331146 A1 | 10/2020 | Vu et al. |
| 2020/0331155 A1 | 10/2020 | Vu et al. |
| 2020/0338730 A1 | 10/2020 | Yamauchi et al. |
| 2020/0338733 A1* | 10/2020 | Dupuis ............... B25J 9/1666 |
| 2020/0353917 A1 | 11/2020 | Leitermann et al. |
| 2020/0368910 A1* | 11/2020 | Chu ............... B25J 9/0084 |
| 2021/0009351 A1 | 1/2021 | Beinhofer et al. |
| 2021/0178591 A1 | 6/2021 | Floyd-jones et al. |
| 2022/0305648 A1 | 9/2022 | Oleynik |
| 2022/0339875 A1 | 10/2022 | Czinger et al. |
| 2023/0031545 A1 | 2/2023 | Oleynik |
| 2023/0063205 A1 | 3/2023 | Nerkar |
| 2023/0363833 A1 | 11/2023 | Gregerson et al. |

FOREIGN PATENT DOCUMENTS

| | | |
|---|---|---|
| CN | 102814813 A | 12/2012 |
| CN | 103722565 A | 4/2014 |
| CN | 104407616 A | 3/2015 |
| CN | 104858876 A | 8/2015 |
| CN | 102186638 B | 3/2016 |
| CN | 106660208 A | 5/2017 |
| CN | 107073710 A | 8/2017 |
| CN | 107206592 A | 9/2017 |
| CN | 107486858 A | 12/2017 |
| CN | 108297059 A | 7/2018 |
| CN | 108453702 A | 8/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 B | 11/2021 |
| CN | 114073585 A | 2/2022 |
| EP | 1241628 A2 | 9/2002 |
| EP | 1901150 A1 | 3/2008 |
| EP | 2306153 A2 | 4/2011 |
| EP | 3250347 A1 | 12/2017 |
| EP | 3725472 A1 | 10/2020 |
| JP | 07100755 | 4/1995 |
| JP | 1997212229 | 8/1997 |
| JP | 1148177 | 2/1999 |
| JP | 11296229 A | 10/1999 |
| JP | 2001166806 A | 6/2001 |
| JP | 2002073130 A | 3/2002 |
| JP | 2003127077 A | 5/2003 |
| JP | 2005022062 A | 1/2005 |
| JP | 2005032196 A | 2/2005 |
| JP | 2006224740 A | 8/2006 |
| JP | 2007257274 A | 10/2007 |
| JP | 2007531110 A | 11/2007 |
| JP | 2008065755 A | 3/2008 |
| JP | 2008134165 A | 6/2008 |
| JP | 2010061293 A | 3/2010 |
| JP | 2010210592 A | 9/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2016099257 A | 5/2016 |
| JP | 2016190315 A | 11/2016 |
| JP | 2016209969 A | 12/2016 |
| JP | 2017131973 A | 8/2017 |
| JP | 2017136677 A | 8/2017 |
| JP | 2017148908 A | 8/2017 |
| JP | 2018505788 A | 3/2018 |
| JP | 2018130793 A | 8/2018 |
| JP | 2018134703 A | 8/2018 |
| JP | 2018144158 A | 9/2018 |
| JP | 2018144166 A | 9/2018 |
| JP | 2019136848 A | 8/2019 |
| JP | 2019188530 A | 10/2019 |
| JP | 2020049623 A | 4/2020 |
| JP | 2020082332 A | 6/2020 |
| JP | 2020110885 A | 7/2020 |
| KR | 19980024584 A | 7/1998 |
| KR | 20110026776 A | 3/2011 |

(56) References Cited

FOREIGN PATENT DOCUMENTS

| | | |
|---|---|---|
| KR | 20130112507 A | 10/2013 |
| KR | 20150126482 A | 11/2015 |
| KR | 20170018564 A | 2/2017 |
| KR | 20170050166 A | 5/2017 |
| KR | 20180125646 A | 11/2018 |
| TW | 201318793 A | 5/2013 |
| TW | 615691 B | 2/2018 |
| TW | 653130 B | 3/2019 |
| WO | 9924914 A1 | 5/1999 |
| WO | 2011096327 A1 | 8/2011 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2018043525 A1 | 3/2018 |
| WO | 2019183141 A1 | 9/2019 |
| WO | 2020040979 A1 | 2/2020 |
| WO | 2020117958 A1 | 6/2020 |

OTHER PUBLICATIONS

Communication Pursuant to Article 94(3) EPC, issued in European Application No. 18209405.2, Mailed Date: Nov. 23, 2020, 4 pages.
European Search Report dated Nov. 17, 2020 for EP Application No. 16743821.7, 4 pages.
Non-Final Office Action Issued in U.S. Appl. No. 16/308,693, Mailed Date: Dec. 11, 2020, 17 pages.
Final Office Action mailed Aug. 2, 2021 for U.S. Appl. No. 16/240,086 in 66 pages.
Notice of Allowance mailed Sep. 23, 2021, for Ritchey, "Motion Planning for Autonomous Vehicles and Reconfigurable Motion Planning Processors," U.S. Appl. No. 16/615,493, 11 pages.
Notice of Allowance mailed Sep. 24, 2021, for Ritchey, "Motion Planning of a Robot Storing a Discretized Environment on One or More Processors and Improved Operation of Same," U.S. Appl. No. 16/268,290, 8 pages.
Non-Final Office Action Issued in U.S. Appl. No. 16/268,290, Mailed Date: Jan. 27, 2021, 54 pages.
Communication Pursuant to Article 94(3) EPC, issued in European Application No. 17811131.6, Mailed Date: Jun. 16, 2020, 5 pages.
Extended European Search Report dated Apr. 10, 2018 for EP Application No. 16743821.7, in 9 pages.
Extended European Search Report issued in European Application No. 17811131.6, Mailed Date: Apr. 24, 2019, 16 pages.
Extended European Search Report issued in European Application No. 18209405.2, Mailed Date: Aug. 2, 2019, 9 pages.
First Office Action issued in Chinese No. 201680006941.3 with English translation, mailed Sep. 29, 2019, 16 pages.
First Office Action issued in Japanese Patent Application No. 2017-557268, Mailed Date: Aug. 7, 2018, 15 pages.
International Search Report and Written Opinion dated Jul. 29, 2020, in PCT/US2020/028343, 11 pages.
International Search Report and Written Opinion for PCT/US2019/016700 mailed May 20, 2019, 14 pages.
International Search Report and Written Opinion for PCT/US2019/023031 dated Aug. 14, 2019 in 19 pages.
International Search Report and Written Opinion for PCT/US2019/064511, mailed Mar. 27, 2020, 10 pages.
International Search Report and Written Opinion issued in PCT Application No. PCT/2020/034551, Mailed Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mail Date: Apr. 25, 2019, 24 pages.
International Search Report and Written Opinion, mailed Jun. 23, 2020 for PCT/US2020/039193, 9 pages.
Non-Final Office Action Issued in U.S. Appl. No. 16/308,693, mailed Jun. 1, 2020, 16 pages.
Non-Final Office Action Issued in U.S. Appl. No. 15/546,441, Mailed Sep. 17, 2019, 58 Pages.
Office Action Issued in Japanese Application No. 2018-564836, mailed Dec. 3, 2019, 3 Pages.
Office Action Issued in Japanese Application No. 2018-564836, mailed May 19, 2020, 3 Pages.
pr.pdf (Or | Definition of Or by Merriam-Webster, Sep. 9, 2019, https://www.merriam-webster.com/dictionary/or, pp. 1-12; Year: 2019.
Second Office Action issued in Japanese Patent Application No. 2017-557268, Mailed Date: Feb. 26, 2019, 5 pages.
Atay, Nuzhet, et al., "A Motion Planning Processor on Reconfigurable Hardware", All Computer Science and Engineering Research, Computer Science and Engineering; Report No. WUCSE-2005-46; Sep. 23, 2005.
Hauck, Scott, et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E., et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean, et al., "Robot Motion Planning on a Chip", Robotics: Science and Systems 2016; Jun. 22, 2016; 9 pages.
Murray, Sean, et al., "The microarchitecture of a real-time robot motion planning accelerator", 2016 49th Annual IEEE/ACM International Symposium on Microarchitecture (Micro), IEEE, Oct. 15, 2016, 12 pages.
Rodriguez, Carlos, et al., "Planning manipulation movements of a dual-arm system considering obstacle removing", Robotics and Autonomous Systems, Elsevier Science Publishers, vol. 62, No. 12, pp. 1816-1826; Aug. 1, 2014.
Stilman, Mike, et al., "Manipulation Planning Among Movable Obstacles", Proceedings of the IEEE Int. Conf. on Robotics and Automation, Apr. 2007.
Siciliano et al. "Robotics. Modelling, Planning and Control", Chapter 12: Motion Planning, pp. 523-559, 2009.
Chen, Chao, Motion Planning for Nonholonomic Vehicles with Space Exploration Guided Heuristic Search, 2016, IEEE.com, Whole Document, 140 pages.
Pan, Jia, et al., Efficient Configuration Space Construction and Optimization for Motion Planning, 2015, Research Robotics, Whole Document, 12 pages.
European Search Report issued in European Application No. 19771537.8, Mailed Date: Mar. 29, 2021, 8 pages.
Final Office Action Issued in U.S. Appl. No. 16/268,290, Mailed Date: Apr. 21, 2021, 58 pages.
Murray, Sean, et al., "Robot Motion Planning on a Chip", Robotics: Science and Systems, Jan. 1, 2016, 9 pages.
Rodriguez, Carlos, et al., "Planning manipulation movements of a dual-arm system considering obstacle removing", Robotics and Autonomous Systems 62 (2014), Elsevier, Journal homepage: www.elsevier.com/locate/robot, pp. 1816-1826.
European Search Report dated Jul. 23, 2021, for European Application No. 19851097.6, 15 pages.
Taiwanese First Office Action—Application No. 106119452 dated Jun. 18, 2021, 25 pages.
Corrales, J.A., et al., Safe Human-robot interaction based on dynamic sphere-swept line bounding volumes, Robotic and Computer-Integrated Manufacturing 27 (2011) 177-185, 9 page.
Pobil, Angel P, et al., "A New Representation for Collision Avoidance and Detection", Proceedings of the 1992 IEEE, XP000300485, pp. 246-251.

(56) References Cited

OTHER PUBLICATIONS

Sato, Yuichi, et al., "Efficient Collision Detection using Fast Distance-Calculation Algorithms for Convex and Non-Convex Objects", Proceeding of the 1996 IEEE, XP-000750294, 8 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Non-Final Office Action Issued in U.S. Appl. No. 16/240,086, Mailed Date: Feb. 11, 2021, 79 pages.
Non-Final Office Action Issued in U.S. Appl. No. 16/308,693, Mailed May 14, 2021, 16 pages.
International Search Report and Written Opinion for PCT/US2021/061427, mailed Apr. 29, 2022, 14 pages.
Notice of Reasons for Rejection, issued in corresponding Japanese Application No. 2021-509212, dated Apr. 7, 2022, 6 pages (English Translation).
Kececi F et al:"Improving Visually Servoed Disassembly Operations by Automatic Camera Placement", Proceedings of the 1998 IEEE International Conference on Robotics and Automation. ICRA '98. May 16-20, 1998; New York, NY : IEEE, US ,XP000784527.
Klampfl Erica et al: "Optimization of workcell layouts in a mixed-model assembly line environment" International Journal of Flexible Manufacturing Systems, Kluwer Academic Publishers, Boston, vol. 17, No. 4, 23 pages, Oct. 10, 2006.
Li, et al., "A Novel Cost Function for Decision-Making Strategies in Automotive Collision Avoidance Systems", 2018 IEEE, ICVES, 8 pages.
Lim, Zhen Yang et al., "Multi-objective hybrid algorithms for layout optimization in multi-robot cellular manufacturing systems", Knowledge-Based Systems, vol. 120, pp. 87-98.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Long Tao et al: "Optimization on multi-robot workcell layout in vertical plane", Information and Automation (ICIA), 2011 IEEE International Conference on, IEEE, Jun. 6, 2011, 6 pages.
Magrini Emanuele et al: "Human-robot coexistence and interaction in open industrial cells", Robotics and Computer Integrated Manufacturing, Elsevier Science Publishers BV. Barking, GB, vol. 61, Aug. 5, 2019 (Aug. 5, 2019), xp08588002, ISSN: 0736-5845.
Non Final Office Action for U.S. Appl. No. 16/883,376, mailed Sep. 27, 2022, 26 pages.
Non Final Office Action for U.S. Appl. No. 17/909,801, mailed Jul. 30, 2024, 18 pages.
Non-Final Office Action Issued in U.S. Appl. No. 17/270,597, mailed Aug. 18, 2023, 25 pages.
Non-Final Office Action Issued in U.S. Appl. No. 17/506,364, Mailed Apr. 28, 2023, 50 pages.
On-Final Office Action Issued in U.S. Appl. No. 17/604,285, mailed Nov. 21, 2023, 28 pages.
Non-Final Office Action Issued in U.S. Appl. No. 18/221,027, mailed Feb. 29, 2024, 13 pages.
Non-Final Office Action Issued in U.S. Appl. No. 18/222,801, mailed Feb. 15, 2024, 44 pages.
Non-Final Office Action Issued in U.S. Appl. No. 16/981,467, Mailed Mar. 16, 2023, 19 pages.
Non-Final Office Action mailed Sep. 14, 2022, for U.S. Appl. No. 16/999,339, 18 pages.
Notice of Allowance for U.S. Appl. No. 17/153,662, mailed Dec. 6, 2022, 15 pages.
Notice of Allowance for U.S. Appl. No. 18/221,027, mailed Jul. 1, 2024, 10 pages.
Notice of Allowance for U.S. Appl. No. 18/222,801, mailed Jul. 3, 2024, 9 pages.
Notice of Allowance, Japanese Application No. 2023-532462, dated Oct. 29, 2024, 3 pages.
Notice of Reasons for Refusal dated Nov. 27, 2023, for Japanese Application No. 2021-561986, 10 pages.
Notice of Reasons for Refusal for Japanese Patent Application No. 2021-571340, mailed Aug. 8, 2023, 8 pages.
Notice of Reasons for Refusal for Japanese Patent Application No. 2022-562247, mailed Sep. 25, 2023, 7 pages.
Notice of Reasons for Refusal. Japanese Application No. 2022-556467, dated Sep. 28, 2023, 10 pages.
Notice of Reasons for Refusal. Japanese Application No. 2023-524134, dated Mar. 12, 2024, 6 pages.
Notice of Reasons for Refusal. Japanese Application No. 2023-532462, dated Jun. 21, 2024, 25 pages.
Notice of Reasons for Rejection dated Feb. 16, 2023, for Japanese Application No. 2021-571340, 10 pages.
Notice of Reasons for Rejection dated Feb. 7, 2023, for Japanese Application No. 2022-054900, 7 pages.
Office Action issued in Taiwan Application No. 108104094, mailed Feb. 6, 2023, 24 pages.
Office Action issued in Taiwan Application No. 109113033, mailed Jan. 19, 2024, 10 pages.
Office Action issued in Taiwan Application No. 109118558, mailed Jan. 4, 2024, 8 pages.
Office Action, ROC (Taiwan) Pat. Appln. No. 108130161 and Search Report—APP.108130161—mailed Sep. 19, 2023.
Oleynikova, et al., "Singed Distance Fields: A Natural Representation for Both Mapping and Planning", 2016, 7 pages.
Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.
Pires, et al., "Robot Trajectory Planning Using Multi-objective Genetic Algorithm Optimization," 2004, Genetic and Evolutionary Computation—GECCO 2004, pp. 615-626 (Year: 2004).
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.
Schwesinger, "Motion Planning n Dynamic Environments with Application to Self-Driving Vehicles", Dr. Andreas Krause, Jan. 1, 2017, XP093029842.
Sonja MacFarlane et al: "Jerk-Bounded Manipulator Trajectory Planning: Design for Real-Time Applications"; IEEE Transactions on Robotics and Automation, IEEE Inc, New York, US, vol. 19, No. 1, Feb. 1, 2003 (Feb. 1, 2003), XP011079596, ISSN: 1042-296X.
Taiwanese First Office Action—Application No. 109120779 dated Nov. 9, 2023, 11 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Bharathi Akilan et al: "Feedrate optimization for smooth minimum-time trajectory generation with higher order constraints", The International Journal of Advanced Manufacturing Technology, vol. 82, No. 5, Jun. 28, 2015 (Jun. 28, 2015), pp. 1029-1040.
Christian Frese et al : "Workspace monitoring and planning for safe mobile manipulaiton", arxiv. org, Cornell University Library, 201 Olin Library Cornell University Ithaca, NY 14853, Jun. 2, 2020 (Jun. 2, 2020), XP081690333. arXiv.2006.01546v1.
Christian Potthast et al: "Seeing with your hands: A Better way to obtain perception capablities with a personal robot", Advance Robotics and Its Social Impacts, Oct. 2, 2011, pp. 50-53. xp032235164.
Communication Pursuant to Article 94(3) EPC, dated Apr. 30, 2024, for European Application No. 19851097.6-1201, 9 pages.
Communication Pursuant to Article 94(3) EPC, dated Jul. 12, 2023, for European Application No. 19 893 874.8-1205, 5 pages.
Dong et al: "Feed-rate optimization with jerk constraints for generating minimum-time trajectories", International Journal of Machine

(56) References Cited

OTHER PUBLICATIONS

Tool Design and Research, Pergamon Press, Oxford, GB, vol. 47, No. 12-13, Aug. 9, 2007 (Aug. 9, 2007), pp. 1941-1955.
Efrain Lopez-Damian et al: "Probabilistic view planner for 3D modelling indoor environments", Intelligent Robots and Systems, 2009. Oct. 10, 2009, pp. 4021-4026, xp031580735.
EP Search Report mailed Aug. 22, 2024, in EP App. No. 21887233. 1-1201/ 4196323 PCT/US2021056317 , 14 pages.
EP Search Report mailed Sep. 1, 2023, EP App No. 21789270.2-1205 /4135940 PCT/US2021026818—23 pages.
European Examination Report mailed Mar. 18, 2024 for European Application No. 20832308.9-1205, 8 pages.
Extended EP Search Report mailed Jan. 29, 2024, EP App No. 21772200.8-1205, 9 pages.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Extended EP Search Report mailed May 10, 2023, EP App No. 20818760.9-1012, 9 pages.
Extended EP Search Report mailed Nov. 7, 2022, EP App No. 21744840.6-1205, 14 pages.
Extended European Search Report mailed Jul. 18, 2022 in EP App No. 20832308.9.
Final Office Action for U.S. Appl. No. 17/506,364, mailed Aug. 25, 2023, 55 pages.
Final Office Action for U.S. Appl. No. 17/682,732, mailed Jul. 7, 2023, 46 pages.
Inal Office Action Issued in U.S. Appl. No. 17/270,597, mailed Oct. 27, 2023, 29 pages.
First Office Action and Search Report issued in Chinese No. 202080040382.4 with English translation, Mailed Date: May 26, 2023, 15 pages.
First Office Action issued in Chinese No. 201980024188.4 with English translation, Mailed Date: Feb. 22, 2023, 28 pages.
First Office Action issued in Chinese No. 201980055188.0 with English translation, Mailed Date: Jul. 1, 2023, 16 pages.
First Office Action issued in Chinese No. 201980080759.6 with English translation, Mailed Date: Jun. 28, 2023, 4 pages.
First Office Action issued in Chinese No. 202080055382.1 with English translation, Mailed Date: Jun. 28, 2023, 30 pages.
First Office Action issued in Chinese No. 202080059714.3 with English translation, Mailed Date: May 24, 2023, 24 pages.
Gasparetto A et al: "Experimental validation and comparative analysis of optimal time-jerk algorithms for trajectory planning", Robotics and Computer Integrated Manufacturing, Elsevier Science Publishers BV., Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Hassan, "Modeling and Stochastic Optimization of Complete Coverage under Uncertainties in Multi-Robot Base Placements," 2016, Intelligent Robots and Systems (IROS} (Year: 2016).
Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.
Hassan, Mahdi et al., "An Approach to Base Placement for Effective Collaboration of Multiple Autonomous Industrial Robots", 2015 IEEE International Conference on Robotics and Automation (ICRA), pp. 3286-3291.
International Search Report and Written Opinion for PCT/US2023/064012, mailed Jul. 10, 2023, 15 pages.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Apanese Decision of Registration for JP 2022-054900, mailed Jan. 9, 2024, 3 pages.
Japanese Notice of Allowance for Application No. 2022-544106, mailed Apr. 30, 2024, 3 pages.
Japanese Office Action, Japanese Application No. 2021-576425, Mar. 13, 2023, 14 pages.
Kalawoun, "Motion planning of multi-robot system for airplane stripping," 2019, Universite Clermont Auvergne (Year: 2019).
Kapanoglu, et al., "A pattern-based genetic algorithm for multi-robot coverage path planning minimizing completion time," 2012, Journal of Intelligent Manufacturing 23, pp. 1035-1045 (Year: 2012).

* cited by examiner

MOTION PLANNING FOR MULTIPLE ROBOTS IN SHARED WORKSPACE

TECHNICAL FIELD

The present disclosure generally relates to robot motion planning, and in particular to systems and methods that perform collision detection via processor circuitry to produce motion plans to drive robots and the like in shared workspaces.

BACKGROUND

Description of the Related Art

Motion planning is a fundamental problem in robot control and robotics. A motion plan specifies a path that a robot can follow from a starting state to a goal state, typically to complete a task without colliding with any obstacles in an operational environment or with a reduced possibility of colliding with any obstacles in the operational environment. Challenges to motion planning involve the ability to perform motion planning at very fast speeds even as characteristics of the environment change. For example, characteristics such as location or orientation of one or more obstacles in the environment may change over time. Challenges further include performing motion planning using relatively low cost equipment, at relative low energy consumption, and with limited amounts of storage (e.g., memory circuits, for instance on processor chip circuitry).

One problem in robotics is operation of two or more robots in a shared workspace (workspaces are commonly referred to as workcells), for example where the robots or robotic appendages of the robots may interfere with one another during the performance of tasks.

One approach to operating multiple robots in a common workspace can be called a task-level approach. The task level approach may employ teach-and-repeat training. An engineer may ensure that the robots are collision-free by defining shared parts of the workspace, and programming the individual robots such that only one robot is in a shared workspace at any given point in time. For example, when a first robot begins to move into a workspace, the first robot sets a flag. A controller (e.g., programmed logic controller (PLC)) reads the flag and prevents other robots from moving into the shared workspace until the first robot de-asserts the flag on exiting the workspace. This approach is intuitive, simple to understand, implement, and troubleshoot. However, this approach necessarily has low work throughput since the use of task-level de-confliction usually leads to at least one of the robots being idle for significant portions of time, even if it would technically be possible for the idle robot to be performing useful work in the shared workspace.

Another approach to operating multiple robots in a common workspace employs offline planning, in order to achieve higher work throughput than in the afore-described task-level de-confliction based approach. To do so, a system may attempt to solve a planning problem in a combined joint space of all robots or robotic appendages. For example, if two 6 degrees-of-freedom (DOF) appendages are in a workspace, a 12 DOF planning problem must be solved. While this approach allows higher performance, the planning can be extremely time consuming. 12 DOF problems appear too large for conventional motion planning algorithms to solve using currently available architectures.

One strategy to address these problems is to optimize motion for a first robot/robotic appendage, and then manually optimize motion for a second robot/robotic appendage. This may employ iteratively simulating motion to ensure that the robots/robotic appendages do not collide with one another, which may take many hours of computation time. Additionally, if a modification to the workspace results in a change in a trajectory of one of the robots/robotic appendages, the entire workflow must be re-validated.

BRIEF SUMMARY

The structures and algorithms described herein facilitate the operation of two or more robots operating in a shared workspace or workcell, preventing or at least reducing the risk that robots or robotic appendages of robots will collide with one another while operating to perform respective tasks in the shared workspace.

The structures and algorithms described herein enable high degree of freedom robots to avoid collisions and continue working in a changing, shared environment. An efficient planning method can be accelerated with or without hardware acceleration, to produce collision-free motion plans in milliseconds. Ultrafast "real-time" motion planning allows robot paths to be decided at runtime during task execution, without the need for training or time-intensive path optimization. Such can advantageously allow coordination of multiple robots in a shared workspace.

The structures and algorithms described herein may, in at least some implementations, guarantee collision-free robot coordination for multiple robots in tight, shared workspaces. Collision-free motion may be guaranteed for all parts (e.g., robotic appendages, end-of-arm tools, end effectors) of the robots, even when operating at high velocity.

The structures and algorithms described herein may advantageously reduce programming effort for multi-robot workspaces, by performing autonomous planning. In at least some implementations, operators do not need to program any safety zones, time synchronization, or joint-space trajectories. Input may be limited to a description of the task(s) to be performed and geometric models of the robots. Input may additionally include representations of fixed objects, or optionally objects with unpredictable trajectories (e.g., people).

The structures and algorithms described herein may advantageously dynamically allocate tasks to be performed by the robots. One or more target poses can change during execution of a task. Overall operation or performance of tasks may continue even when a given robot fails or would be blocked.

The structures and algorithms described herein may, in at least some implementations, allow robots to share information, for example via a non-proprietary communications channel (e.g., Ethernet connection), which may advantageously facilitate integration of robots from different manufacturers in a shared workspace.

The structures and algorithms described herein may, in at least some implementations, operate without cameras or other perception sensors. In at least some implementations, coordination between the robots relies on the geometric models of the robots, the ability of the robots to communicate their respective motion plans, and geometric models of a shared workspace. In other implementations, visual or other perception may optionally be employed, for example to avoid humans or other dynamic obstacles that might enter or occupy portions of the shared workspace.

A wide variety of algorithms are used to solve motion planning problems. Each of these algorithms typically need to be able to determine whether a given pose of a robot or a motion from one pose to another pose results in a collision, either with the robot itself or with obstacles in the environment. Collision assessment or checking can be performed "in software" using processors that execute processor-executable instructions from a stored set of processor-executable instructions, to perform an algorithm. Collision assessment or checking can be performed "in hardware" using a set of dedicated hardware circuits (e.g., collision checking circuits implemented in a field programmable gate array (FPGA), application specific integrated circuit (ASIC)). Such circuits may, for example, represent volumes swept by a robot/robotic appendage or portion thereof (i.e., swept volumes) during a respective motion or transition between two states. The circuits may, for example, produce a Boolean evaluation indicative of whether a motion will collide with any obstacles, where at least some of the obstacles represent volumes swept in executing a motion or transition by the other robots operating in the shared workspace.

Aspect 1. A method of controlling a plurality of robots to operate in a common workspace is described, the common workspace being a workspace in which a range of motion of the robots overlap. The method may be summarized as comprising:

generating a first motion plan for a robot $R_1$ of the plurality of robots;

for each of at least one robot $R_i$, from i equals 2 to i equals n where n is a total number of the robots in the plurality of robots and n is an integer that is equal to or greater than 2, representing a number of motions of at least the robot $R_1$ as at least one obstacle;

performing collision detection for at least one motion of at least a portion of the robot $R_i$ with respect to the representation of the at least one obstacle; and generating a first motion plan for the robot $R_i$ based at least in part on the collision detection for the at least one motion of at least the portion of the robot $R_i$; and the method further comprising:

providing signals to control operation of at least one of the robot $R_1$ through the robot $R_n$ based at least in part on the respective first motion plan for the corresponding one of the plurality of robots.

Aspect 2. The method of aspect 1, further comprising:

in response to completion of at least one motion by the robot $R_1$, updating a representation of obstacles to eliminate portions corresponding to the completed at least one motion by the robot $R_1$.

Aspect 3. The method of aspect 1, further comprising:

in response to completion of at least one motion by any one or more of the robot $R_2$ through the robot $R_n$, updating a representation of obstacles to eliminate portions corresponding to the completed at least one motion by a respective one of the robot $R_2$ through the robot $R_n$.

Aspect 4. The method of aspect 1, further comprising:

generating a second motion plan for a robot $R_1$ of the plurality of robots;

for each of at least one robot $R_i$, from i equals 2 to i equals n where n is a total number of the robots in the plurality of robots and n is an integer that is equal to or greater than 2, representing a number of motions of at least the robot $R_1$ as at least one obstacle;

performing collision detection for at least one motion of at least a portion of the robot $R_i$ with respect to the representation of the at least one obstacle; and generating a second motion plan for the robot $R_i$ based at least in part on the collision detection for the at least one motion of at least the portion of the robot $R_i$; and the method further comprising:

providing signals to control operation of at least one of the robot $R_1$ through the robot $R_n$ based at least in part on the respective second motion plan for the corresponding one of the plurality of robots.

Aspect 5. The method of aspect 4 wherein the generating a first motion plan for the robot $R_1$ through the robot $R_n$ occurs in succession from i equals 1 to i equals n.

Aspect 6. The method of aspect 5 wherein the generating a second motion plan for the robot $R_1$ through the robot $R_n$ occurs in succession from i equals 1 to i equals n.

Aspect 7. The method of aspect 5 wherein the generating a second motion plan for the robot $R_1$ through the robot $R_n$ does not occur in succession from i equals 1 to i equals n.

Aspect 8. The method of aspect 4 wherein providing signals to control operation of at least one of the robot $R_1$ through the robot $R_n$ based at least in part on the respective first motion plan for the corresponding one of the plurality of robots includes providing signals that cause one robot $R_i$ to move before the robot $R_1$, and further comprising:

in response to completion of at least one motion by the robot $R_i$, updating a representation of obstacles to eliminate portions corresponding to the completed at least one motion by the robot $R_i$ before generating the second motion plan for the robot $R_1$ of the plurality of robots.

Aspect 9. The method of aspect 1, further comprising:

generating a second motion plan for a robot $R_1$ of the plurality of robots;

for some but not all of two or more robots $R_i$, from i equals 2 to i equals n where n is a total number of the robots in the plurality of robots and n is an integer that is equal to or greater than 3, representing a number of motions of at least the robot $R_1$ as at least one obstacle;

performing collision detection for at least one motion of at least a portion of the robot $R_i$ with respect to the representation of the at least one obstacle; and generating a second motion plan for the robot $R_i$ based at least in part on the collision detection for the at least one motion of at least the portion of the robot $R_i$; and the method further comprising:

providing signals to control operation of at least one of the robot $R_1$ through the robot Rn based at least in part on the respective second motion plan for the corresponding one of the plurality of robots.

Aspect 10. The method of aspect 9 wherein the generating a second motion plan for one of the robot $R_2$ through the robot $R_n$ is skipped.

Aspect 11. The method of aspect 9 wherein the generating a second motion plan for one of the robot $R_2$ through the robot $R_n$ is skipped in response to a respective one of the robot $R_2$ through the robot $R_n$ being blocked from movement by another one of the robot $R_2$ through the robot $R_n$.

Aspect 12. The method of aspect 9 wherein the generating a second motion plan for one of the robot $R_2$ through the robot $R_n$ is skipped in response to a respective one of the robot $R_2$ through the robot $R_n$ having an error state that indicates an error condition has occurred.

Aspect 13. The method of aspect 1 wherein representing a number of motions of at least the robot $R_1$ as at least one obstacle includes, for at least one robot $R_{i+1}$, representing the motion of two or more of the robot $R_1$ through the robot $R_i$ as obstacles before performing the collision detection for the at least one motion of the robot $R_{i+1}$.

Aspect 14. The method of aspect 13 wherein representing the motion of two or more of robot $R_1$ through the robot $R_i$ as obstacles before performing the collision detection for the at least one motion of the robot $R_{i+1}$ includes: using a set of swept volumes previously computed at a pre-runtime, the swept volumes each of which represents a respective volume swept by at least a portion of the respective one of the robot $R_1$ through the robot $R_i$ as the portion of the respective one of the robot $R_1$ through the robot $R_i$ moves along a trajectory represented by the respective motion.

Aspect 15. The method of aspect 13, further comprising:
receiving a set of swept volumes previously computed at a pre-runtime, the swept volumes each of which represents a respective volume swept by at least a portion of the respective one of robot $R_1$ through robot $R_i$ as the portion of the respective one of the robot $R_1$ through the robot $R_i$ moves along a trajectory represented by the respective motion.

Aspect 16. The method of aspect 13 wherein representing the motion of two or more of robot $R_1$ through the robot $R_i$ as obstacles before performing the collision detection for the at least one motion of the robot $R_{i+1}$ includes: representing the motion of two or more of robot $R_1$ through the robot $R_i$ as at least one of: an occupancy grid, a hierarchical tree or a Euclidean distance field.

Aspect 17. The method of aspect 1 wherein representing each of the motions of at least the robot $R_1$ as at least one obstacle includes using a respective swept volume to represent the respective motion, the swept volume corresponding to a volume swept by at least a portion of at least the robot $R_1$ during the respective motion and wherein performing collision detection for at least one motion of at least a portion of the robot $R_i$ with respect to the representation of the at least one obstacle includes performing collision detection using a representation of a swept volume previously computed at a pre-runtime, the swept volume which represents a respective volume swept by at least a portion of the robot $R_i$ as the portion of the robot $R_i$ moves along a trajectory represented by the respective motion.

Aspect 18. The method of aspect 1, further comprising:
for each of robot $R_1$ through the robot $R_n$ of the plurality of robots, representing the respective robot via a respective motion planning graph, each motion planning graph comprising a plurality of nodes and edges, the nodes which represent respective states of the respective robot and the edges which represent valid transitions between respective states represented by the respective ones of a respective pair of nodes connected by the edge.

Aspect 19. A system to control a plurality of robots to operate in a common workspace is described, the common workspace being a workspace in which a range of motion of the robots overlap. The system may be summarized as comprising:
at least one processor; and
at least one nontransitory storage medium communicatively coupled to the at least one processor and that stores processor-executable instructions which, when executed by the at least one processor, cause the at least one processor to:
generate a first motion plan for a robot $R_1$ of the plurality of robots;
for each of at least one robot $R_i$, from i equals 2 to i equals n where n is a total number of the robots in the plurality of robots and n is an integer that is equal to or greater than 2,
represent a number of motions of at least the robot $R_1$ as at least one obstacle;
perform collision detection for at least one motion of at least a portion of the robot $R_i$ with respect to the representation of the at least one obstacle; and
generate a first motion plan for the robot $R_i$ based at least in part on the collision detection for the at least one motion of at least the portion of the robot $R_i$; and
further:
provide signals to control operation of at least one of the robot $R_1$ through the robot $R_n$ based at least in part on the respective first motion plan for the corresponding one of the plurality of robots.

Aspect 20. The system of aspect 19 wherein, when executed by the at least one processor, the processor-executable instructions cause the at least one processor further to:
in response to completion of at least one motion by the robot $R_1$, update a representation of obstacles to eliminate portions corresponding to the completed at least one motion by the robot $R_1$.

Aspect 21. The system of aspect 19 wherein, when executed by the at least one processor, the processor-executable instructions cause the at least one processor further to:
in response to completion of at least one motion by any one or more of the robot $R_2$ through the robot $R_n$, update a representation of obstacles to eliminate portions corresponding to the completed at least one motion by a respective one of the robot $R_2$ through the robot $R_n$.

Aspect 22. The system of aspect 19 wherein, when executed by the at least one processor, the processor-executable instructions cause the at least one processor further to:
generate a second motion plan for a robot $R_1$ of the plurality of robots;
for each of at least one robot $R_i$, from i equals 2 to i equals n where n is a total number of the robots in the plurality of robots and n is an integer that is equal to or greater than 2,
represent a number of motions of at least the robot $R_1$ as at least one obstacle;
perform collision detection for at least one motion of at least a portion of the robot $R_i$ with respect to the representation of the at least one obstacle; and
generate a second motion plan for the robot $R_i$ based at least in part on the collision detection for the at least one motion of at least the portion of the robot $R_i$; and
further:
provide signals to control operation of at least one of the robot $R_1$ through the robot $R_n$ based at least in part on the respective second motion plan for the corresponding one of the plurality of robots.

Aspect 23. The system of aspect 22 wherein the generation of a first motion plan for the robot $R_1$ through the robot $R_n$ occurs in succession from i equals 1 to i equals n.

Aspect 24. The system of aspect 23 wherein the generation of a second motion plan for the robot $R_1$ through the robot $R_n$ occurs in succession from i equals 1 to i equals n.

Aspect 25. The system of aspect 23 wherein the generation of a second motion plan for the robot $R_1$ through the robot $R_n$ does not occur in succession from i equals 1 to i equals n.

Aspect 26. The system of aspect 22 wherein to control operation of at least one of the robot $R_1$ through the robot $R_n$ based at least in part on the respective first motion plan for the corresponding one of the plurality of robots, when executed by the at least one processor, the processor-executable instructions cause the at least one processor to provide signals that cause one robot $R_i$ to move before the robot $R_1$, and further to:

in response to completion of at least one motion by the robot $R_i$, update a representation of obstacles to eliminate portions corresponding to the completed at least one motion by the robot $R_i$ before generation of the second motion plan for the robot $R_1$ of the plurality of robots.

Aspect 27. The system of aspect 19 wherein, when executed by the at least one processor, the processor-executable instructions cause the at least one processor further to:

generate a second motion plan for a robot $R_1$ of the plurality of robots;

for some but not all of two or more robots $R_i$, from i equals 2 to i equals n where n is a total number of the robots in the plurality of robots and n is an integer that is equal to or greater than 3, represent a number of motions of at least the robot $R_1$ as at least one obstacle;

perform collision detection for at least one motion of at least a portion of the robot $R_i$ with respect to the representation of the at least one obstacle; and generate a second motion plan for the robot $R_i$ based at least in part on the collision detection for the at least one motion of at least the portion of the robot $R_i$; and further:

provide signals to control operation of at least one of the robot $R_1$ through the robot Rn based at least in part on the respective second motion plan for the corresponding one of the plurality of robots.

Aspect 28. The system of aspect 27 wherein generation of a second motion plan for one of the robot $R_2$ through the robot Rn is skipped.

Aspect 29. The system of aspect 27 wherein the generation of a second motion plan for one of the robot $R_2$ through the robot $R_n$ is skipped in response to a respective one of the robot $R_2$ through the robot $R_n$ being blocked from movement by another one of the robot $R_2$ through the robot $R_n$.

Aspect 30. The system of aspect 27 wherein the generation of a second motion plan for one of the robot $R_2$ through the robot $R_n$ is skipped in response to a respective one of the robot $R_2$ through the robot $R_n$ having an error state that indicates an error condition has occurred.

Aspect 31. The system of aspect 19 wherein to represent a number of motions of at least the robot $R_1$ as at least one obstacle, when executed by the at least one processor, the processor-executable instructions cause the at least one processor to, for at least one robot $R_{i+1}$, represent the motion of two or more of the robot $R_1$ through the robot $R_i$ as obstacles before the collision detection is performed for the at least one motion of the robot $R_{i+1}$.

Aspect 32. The system of aspect 31 wherein to represent the motion of two or more of robot $R_1$ through the robot $R_i$ as obstacles, when executed by the at least one processor, the processor-executable instructions cause the at least one processor to: use a set of swept volumes previously computed at a pre-runtime, the swept volumes each of which represents a respective volume swept by at least a portion of the respective one of the robot $R_1$ through the robot $R_i$ as the portion of the respective one of the robot $R_1$ through the robot $R_i$ moves along a trajectory represented by the respective motion.

Aspect 33. The system of aspect 31 wherein, when executed by the at least one processor, the processor-executable instructions cause the at least one processor further to:

receive a set of swept volumes previously computed at a pre-runtime, the swept volumes each of which represents a respective volume swept by at least a portion of the respective one of robot $R_1$ through robot $R_i$ as the portion of the respective one of the robot $R_1$ through the robot $R_i$ moves along a trajectory represented by the respective motion.

Aspect 34. The system of aspect 31 wherein to represent the motion of two or more of robot $R_1$ through the robot $R_i$ as obstacles before the collision detection is performed for the at least one motion of the robot $R_{i+1}$, when executed by the at least one processor, the processor-executable instructions cause the at least one processor to: represent the motion of two or more of robot $R_1$ through the robot $R_i$ as at least one of: an occupancy grid, a hierarchical tree or a Euclidean distance field.

Aspect 35. The system of aspect 19 wherein to represent each of the motions of at least the robot $R_1$ as at least one obstacle, when executed by the at least one processor, the processor-executable instructions cause the at least one processor to: use a respective swept volume to represent the respective motion, the swept volume corresponding to a volume swept by at least a portion of at least the robot $R_1$ during the respective motion and wherein to perform collision detection for at least one motion of at least a portion of the robot $R_i$ with respect to the representation of the at least one obstacle, when executed by the at least one processor, the processor-executable instructions cause the at least one processor to perform collision detection based at least in part on a representation of a swept volume previously computed at a pre-runtime, the swept volume which represents a respective volume swept by at least a portion of the robot $R_i$ as the portion of the robot $R_i$ moves along a trajectory represented by the respective motion.

Aspect 36. The system of aspect 19 wherein for each of robot $R_1$ through the robot $R_n$ of the plurality of robots, the respective robot is represented via a respective motion planning graph, each motion planning graph comprising a plurality of nodes and edges, the nodes which represent respective states of the respective robot and the edges which represent valid transitions between respective states represented by the respective ones of a respective pair of nodes connected by the edge.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms determine, determining and determined when used in the context of whether a collision will occur or result, mean that an assessment or prediction is made as to whether a given pose or movement between two poses via a number of intermediate poses will result in a collision between a portion of a robot and some object (e.g., another portion of the robot, a portion of another robot, a persistent obstacle, a transient obstacle, for instance a person).

The headings and Abstract of the Disclosure provided herein are for convenience only and do not interpret the scope or meaning of the embodiments.

Figure 1:
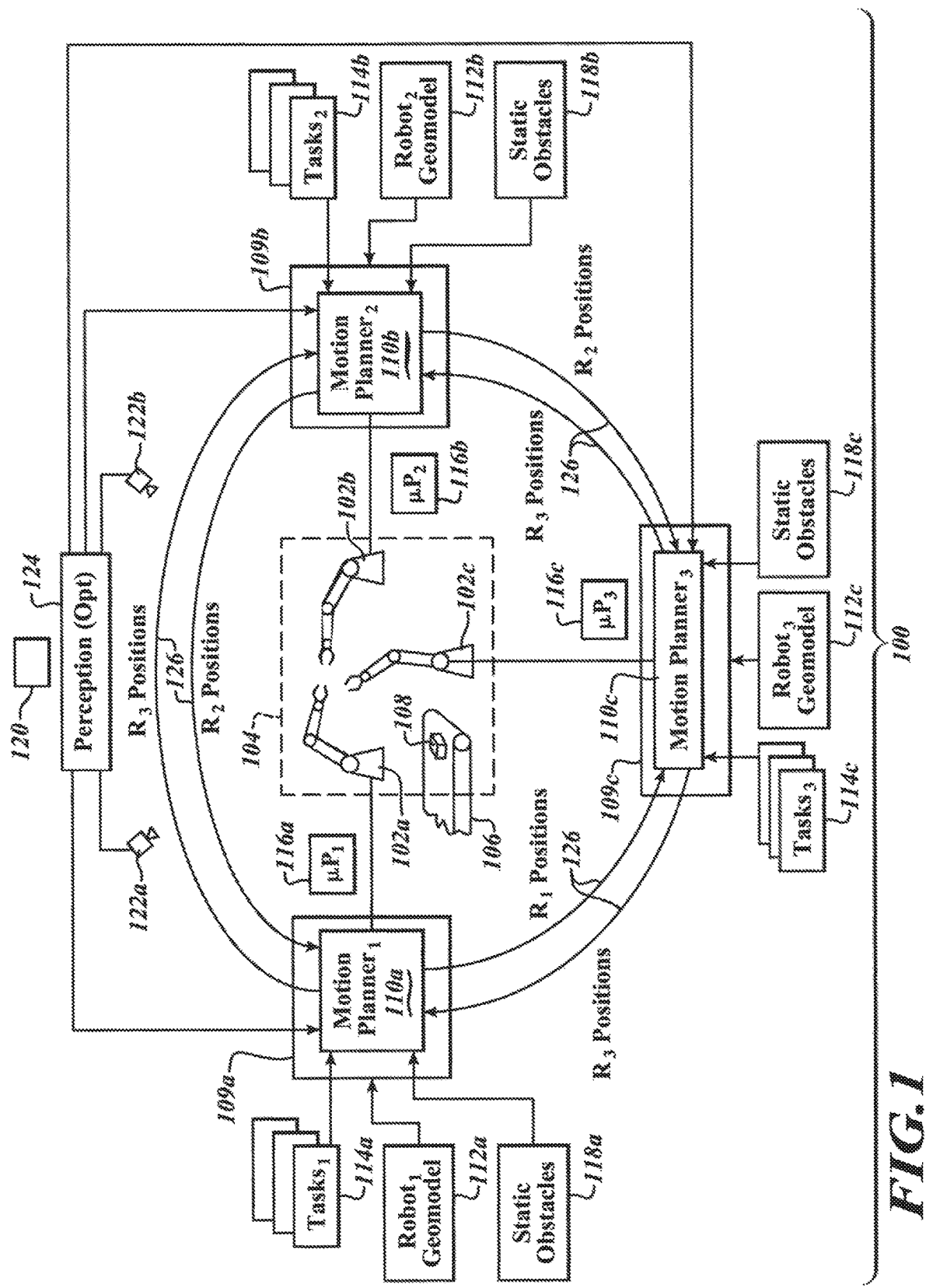
FIG. 1 is a schematic diagram of a robotic system that includes a plurality of robots that operate in a shared workspace to carry out tasks, and which includes motion planners that dynamically produce motion plans for the robots that take into account the planned motions of the other ones of the robots, and which optionally includes a perception subsystem, according to one illustrated implementation.

FIG. 1 shows a robotic system 100 which includes a plurality of robots 102a, 102b, 102c (collectively 102) that operate in a shared workspace 104 to carry out tasks, according to one illustrated implementation.

The robots 102 can take any of a large variety of forms. Typically, the robots will take the form of, or have, one or more robotic appendages. The robots 102 may include one or more linkages with one or more joints, and actuators (e.g., electric motors, stepper motors, solenoids, pneumatic actuators or hydraulic actuators) coupled and operable to move the linkages in response to control or drive signals. Pneumatic actuators may, for example, include one or more pistons, cylinders, valves, reservoirs of gas, and/or pressure sources (e.g., compressor, blower). Hydraulic actuators may, for example, include one or more pistons, cylinders, valves, reservoirs of fluid (e.g., low compressibility hydraulic fluid), and/or pressure sources (e.g., compressor, blower). The robotic system 100 may employ other forms of robots 102, for example autonomous vehicles.

The shared workspace 104 typically represents a three-dimensional space in which the robots 102a-102c may operate and move, although in certain limited implementations the shared workspace 104 may represent a two-dimensional space. The shared workspace 104 is a volume or area in which at least portions of the robots 102 may overlap in space and time or otherwise collide if motion is not controlled to avoid collision. It is noted that the workspace 104 is different than a respective "configuration space" or "C-space" of the robot 102a-102c, which is described below, for example with reference to FIG. 3.

As explained herein, a robot 102a or portion thereof may constitute an obstacle when considered from a viewpoint of another robot 102b (i.e., when motion planning for another robot 102b). The shared workspace 104 may additionally include other obstacles, for example pieces of machinery (e.g., conveyor 106), posts, pillars, walls, ceiling, floor, tables, humans, and/or animals. The shared workspace 104 may additionally include one or more work items or work pieces 108 which the robots 102 manipulate as part of performing tasks, for example one or more parcels, packaging, fasteners, tools, items or other objects.

Figure 2:
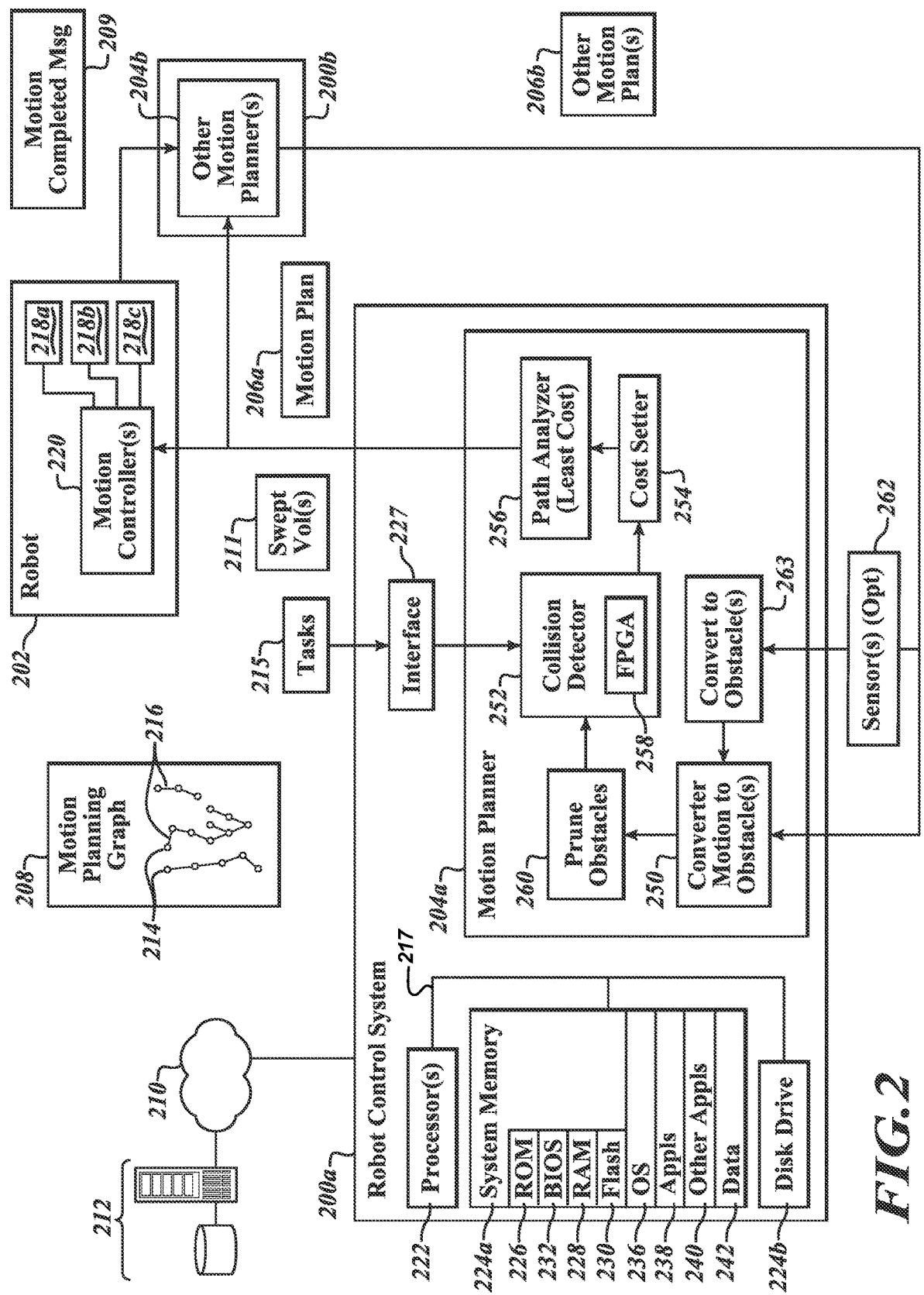
FIG. 2 is a functional block diagram of an environment in which a first robot is controlled via a robot control system that includes a motion planner, provides motion plans to other motion planners of other robots, and further includes a source of planning graphs that is separate and distinct from the motion planners, according to one illustrated implementation.

The robotic system 100 may include one or more robot control systems 109a, 109b, 109c, (three shown, collectively 109) which include one or more motion planners, for example a respective motion planner 110a, 110b, 110c (three shown, collectively 110) for each of the robots 102a, 102b, 102c, respectively. In at least some implementations, a single motion planner 109 may be employed to generate motion plans for two, more, or all robots 102. The motion planners 110 are communicatively coupled to control respective ones of the robots 102. The motion planners 110 are also communicatively coupled to receive various types of input, for example including robot geometric models 112a, 112b, 112c (also known as kinematic models, collectively 112), task messages 114a, 114b, 114c (collectively 114), and motion plans or other representations of motions 116a, 116b, 116c (collectively 116) for the other robots 102 operating in the shared workspace 104. The robot geometric models 112 define a geometry of a given robot 102, for example in terms of joints, degrees of freedom, dimensions (e.g., length of linkages), and/or in terms of the respective C-space of the robot 102. (As illustrated in FIG. 2, the conversion of robot geometric models 112 to motion planning graphs may occur before runtime or task execution, performed for example by a processor-based system that is distinct and separate from the robotic system 100 using any of a variety of techniques.) The task messages 114 specify tasks to be performed, for example in terms of end poses, end configurations or end states, and/or intermediate poses, intermediate configurations or intermediate states of the respective robot 102. Poses, configurations or states may, for example, be defined in terms of joint positions and joint angles/rotations (e.g., joint poses, joint coordinates) of the respective robot 102.

The motion planners 110 are optionally communicatively coupled to receive as input static object data 118a, 118b, 118c (collectively 118). The static object data 118 is representative (e.g., size, shape, position, space occupied) of static objects in the workspace 104, which may, for instance, be known a priori. Static object may, for example, include one or more of fixed structures in the workspace, for instance posts, pillars, walls, ceiling, floor, conveyor 106. Since the robots 102 are operating in a shared workspace, the static objects will typically be identical for each robot. Thus, in at least some implementations, the static object data 118a, 118b, 118c supplied to the motion planners 110 will be identical. In other implementations, the static object data 118a, 118b, 118c supplied to the motion planners 110 may differ for each robot, for example based on a position or orientation of the robot 102 in the environment or an environmental perspective of the robot 102. Additionally, as noted above, in some implementations, a single motion planner 110 may generate the motion plans for two or more robots 102.

The motion planners 110 are optionally communicatively coupled to receive as input perception data 120, for example provided by a perception subsystem 124. The perception data 120 is representative of static and/or dynamic objects in the workspace 104 that are not known a priori. The perception data 120 may be raw data as sensed via one or more sensors (e.g., cameras 122a, 122b) and/or as converted to digital representations of obstacles by the perception subsystem 124.

The optional perception subsystem 124 may include one or more processors, which may execute one or more machine-readable instructions that cause the perception subsystem 124 to generate a respective discretization of a representation of an environment in which the robots 102 will operate to execute tasks for various different scenarios.

The optional sensors (e.g., camera 122a, 122b) provide raw perception information (e.g., point cloud) to perception subsystem 124. The optional perception subsystem 124 may process the raw perception information, and resulting perception data may be provided as a point cloud, an occupancy grid, boxes (e.g., bounding boxes) or other geometric objects, or stream of voxels (i.e., a "voxel" is an equivalent to a 3D or volumetric pixel) that represent obstacles that are present in the environment. The representation of obstacles may optionally be stored in on-chip memory. The perception data 120 may represent which voxels or sub-volumes (e.g., boxes) are occupied in the environment at a current time (e.g., run time). In some implementations, when representing either a robot or another obstacle in the environment, the respective surfaces of the robot or an obstacle (e.g., including other robots) may be represented as either voxels or meshes of polygons (often triangles). In some cases, it is advantageous to represent the objects instead as boxes (rectangular prisms, bounding boxes) or other geometric objects. Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, performing intersection tests for boxes is comparable in complexity to performing intersection tests for voxels.

At least some implementations may combine the outputs of multiple sensors and the sensors may provide a very fine granularity voxelization. However, in order for the motion planner to efficiently perform motion planning, coarser voxels (i.e., "processor voxels") may be used to represent the environment and a volume in 3D space swept by the robot 102 or portion thereof when making transitions between various states, configurations or poses. Thus, the optional perception subsystem 124 may transform the output of the sensors (e.g., camera 122a, 122b) accordingly. For example, the output of the camera 122a, 122b may use 10 bits of precision on each axis, so each voxel originating directly from the camera 122a, 122b has a 30-bit ID, and there are 230 sensor voxels. The system 200a (FIG. 2) may use 6 bits of precision on each axis for an 18-bit processor voxel ID, and there would be 218 processor voxels. Thus there could, for example, be 212 sensor voxels per processor voxel. At runtime, if the system 200a determines any of the sensor voxels within a processor voxel is occupied, the system 200a considers the processor voxel to be occupied and generates the occupancy grid accordingly.

Various communicative paths are illustrated in FIG. 1 as arrows. The communicative paths may for example take the form of one or more wired communications paths (e.g., electrical conductors, signal buses, or optical fiber) and/or one or more wireless communications paths (e.g., via RF or microwave radios and antennas, infrared transceivers). Notably, each of the motion planners 110a-110c is communicatively coupled to one another, either directly or indirectly, to provide the motion plan for a respective one of the robots 102a-102c to the other ones of the motion planners 110a-110c. For example, the motion planners 110a-110c may be communicatively coupled to one another via a network infrastructure, for instance a non-proprietary network infrastructure (e.g., Ethernet network infrastructure) 126. Such may advantageously allow operation of robots from different manufacturers in a shared workspace.

The term "environment" is used to refer to a current workspace of a robot, which is a shared workspace where two or more robots operate in the same workspace. The environment may include obstacles and/or work pieces (i.e., items with which the robots are to interact or act on or act with). The term "task" is used to refer to a robotic task in which a robot transitions from a pose A to a pose B without colliding with obstacles in its environment. The task may perhaps involve the grasping or un-grasping of an item, moving or dropping an item, rotating an item, or retrieving or placing an item. The transition from pose A to pose B may optionally include transitioning between one or more intermediary poses. The term "scenario" is used to refer to a class of environment/task pairs. For example, a scenario could be "pick-and-place tasks in an environment with a 3-foot table or conveyor and between x and y obstacles with sizes and shapes in a given range." There may be many different task/environment pairs that fit into such criteria, depending on the locations of goals and the sizes and shapes of obstacles.

The motion planners 110 are operable to dynamically produce motion plans 116 to cause the robots 102 to carry out tasks in an environment, while taking into account the planned motions (e.g., as represented by respective motion plans 116 or resulting swept volumes) of the other ones of the robots 102. The motion planners 110 may optionally take into account representations of a priori static objects 118 and/or perception data 120 when producing motion plans 116. Optionally, the motion planners 110 may take into account a state of motion of other robots 102 at a given time, for instance whether or not another robot 102 has completed a given motion or task, and allowing a recalculation of a motion plan based on a motion or task of one of the other robots being completed, thus making available a previously excluded path or trajectory to choose from. Optionally, the motion planners 110 may take into account an operational condition of the robots 102, for instance an occurrence or detection of a failure condition, an occurrence or detection of a blocked state, and/or an occurrence or detection of request to expedite or alternatively delay or skip a motion planning request.

FIG. 2 shows an environment in which a first robot control system 200a includes a first motion planner 204a, that generates first motion plans 206a to control operation of a first robot 202, and which provides the first motion plans 206a and/or representations of motions as obstacles to other motion planners 204b of other robot control systems 200b via at least one communications channel (indicated by proximate arrows, e.g., transmitter, receiver, transceiver, radio, router, Ethernet) to control other robots (not illustrated in FIG. 2), according to one illustrated implementation.

Likewise, the other motion planners 204b of the other robot control systems 200b generate other motion plans 206b to control operation of other robots (not illustrated in FIG. 2), and provide the other motion plans 206b to the first motion planner 204a and other ones of the other motion planners 204b of other robot control systems 200b. The motion planners 204a, 204b may also receive motion completed messages 209, which indicate when motions of various robots 202 have been completed. This may allow the motion planners 204a, 204b to generate new or updated motion plans based on a current or updated status of the environment. For example, a portion of a shared workspace may become available for a second robot to perform a task after a first robot 202 has completed a motion that is part or all of a task performed by the first robot.

The robot control system(s) 200a, 200b may be communicatively coupled, for example via at least one communications channel (indicated by proximate arrows, e.g., transmitter, receiver, transceiver, radio, router, Ethernet), to receive motion planning graphs 208 and/or swept volume representations 211 from one or more sources 212 of motion planning graphs 208 and/or swept volume representations 211. The source(s) 212 of motion planning graphs 208 and/or swept volumes 211 may be separate and distinct from the motion planners 204a, 204b, according to one illustrated implementation. The source(s) 212 of motion planning graphs 208 and/or swept volumes 211 may, for example, be one or more processor-based computing systems (e.g., server computers), which may be operated or controlled by respective manufacturers of the robots 202 or by some other entity. The motion planning graphs 208 may each include a set of nodes 214 (only two called out in FIG. 2) which represent states, configurations or poses of the respective robot, and a set of edges 216 (only two called out in FIG. 2) which couple nodes 214 of respective pairs of nodes 214, and which represent legal or valid transitions between the states, configurations or poses. States, configurations or poses may, for example, represent sets of joint positions, orientations, poses, or coordinates for each of the joints of the respective robot 202. Thus, each node 214 may represent a pose of a robot 202 or portion thereof as completely defined by the poses of the joints comprising the robot 202. The motion planning graphs 208 may be determined, set up, or defined prior to a runtime (i.e., defined prior to performance of tasks), for example during a pre-runtime or configuration time. The swept volumes 211 represent respective volumes that a robot 202 or portion thereof would occupy when executing a motion or transition that corresponds to a respective edge of the motion planning graph 208. The swept volumes 211 may be represented in any of a variety of forms, for example as voxels, a Euclidean distance field, a hierarchy of geometric objects. This advantageously permits some of the most computationally intensive work to be performed before runtime, when responsiveness is not a particular concern.

Each robot 202 may include a set of links, joints, end-of-arm tools or end effectors, and/or actuators 218a, 218b, 218c (three, shown, collectively 218) operable to move the links about the joints. Each robot 202 may include one or more motion controllers (e.g., motor controllers) 220 (only one shown) that receive control signals, for instance in the form of motion plans 206a, and that provides drive signals to drive the actuators 218.

There may be a respective robot control system 200a, 200b for each robot 202, or alternatively one robot control system 200a may perform the motion planning for two or more robots 202. One robot control system 200a will be described in detail for illustrative purposes. Those of skill in the art will recognize that the description can be applied to similar or even identical additional instances of other robot control systems 200b.

The robot control system 200a may comprise one or more processor(s) 222, and one or more associated nontransitory computer- or processor-readable storage media for example system memory 224a, disk drives 224b, and/or memory or registers (not shown) of the processors 222. The nontransitory computer- or processor-readable storage media 224a, 224b are communicatively coupled to the processor(s) 222 via one or more communications channels, such as system bus 217. The system bus 217 can employ any known bus structures or architectures, including a memory bus with memory controller, a peripheral bus, and/or a local bus. One or more of such components may also, or instead, be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot control system 200a may also be communicably coupled to one or more remote computer systems, e.g., server computer (e.g. source of motion planning graphs 212), desktop computer, laptop computer, ultraportable computer, tablet computer, smartphone, wearable computer and/or sensors (not illustrated in FIG. 2), that are directly communicably coupled or indirectly communicably coupled to the various components of the robot control system 200, for example via a network interface 227. Remote computing systems (e.g., server computer (e.g., source 212 of motion planning graphs)) may be used to program, configure, control or otherwise interface with or input data (e.g., motion planning graphs 208, swept volumes 211, task specifications 215) to the robot control system 200*a* and various components within the robot control system 200. Such a connection may be through one or more communications channels, for example, one or more wide area networks (WANs), for instance, Ethernet, or the Internet, using Internet protocols. As noted above, pre-runtime calculations (e.g., generation of the family of motion planning graphs) may be performed by a system that is separate from the robot control system 200*a* or robot 202, while runtime calculations may be performed by the processor(s) 222 of the robot control system 200, which in some implementation may be on-board the robot 202. As noted, the robot control system 200*a* may include one or more processor(s) 222, (i.e., circuitry), nontransitory storage media 224*a*, 224*b*, and system bus 217 that couples various system components. The processors 222 may be any logic processing unit, such as one or more central processing units (CPUs), digital signal processors (DSPs), graphics processing units (GPUs), field programmable gate arrays (FPGAs), application-specific integrated circuits (ASICs), programmable logic controllers (PLCs), etc. The system memory 224*a* may include read-only memory ("ROM") 226, random access memory ("RAM") 228 FLASH memory 230, EEPROM (not shown). A basic input/output system ("BIOS") 232, which can form part of the ROM 226, contains basic routines that help transfer information between elements within the robot control system 200, such as during start-up.

The drive 224*b* may be, for example, a hard disk drive for reading from and writing to a magnetic disk, a solid state (e.g., flash memory) drive for reading from and writing to solid state memory, and/or an optical disk drive for reading from and writing to removable optical disks. The robot control system 200*a* may also include any combination of such drives in various different embodiments. The drive 224*b* may communicate with the processor(s) 222 via the system bus 217. The drive(s) 224*b* may include interfaces or controllers (not shown) coupled between such drives and the system bus 217, as is known by those skilled in the relevant art. The drive 224*b* and its associated computer-readable media provide nonvolatile storage of computer- or processor readable and/or executable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Executable instructions and data can be stored in the system memory 224*a*, for example an operating system 236, one or more application programs 238, other programs or modules 240 and program data 242. Application programs 238 may include processor-executable instructions that cause the processor(s) 222 to perform one or more of: generating discretized representations of the environment in which the robot 202 will operate, including obstacles and/or target objects or work pieces in the environment where planned motions of other robots may be represented as obstacles; generating motion plans or road maps including calling for or otherwise obtaining results of a collision assessment, setting cost values for edges in a motion planning graph, and evaluating available paths in the motion planning graph; and/or optionally storing the determined plurality of motion plans or road maps. The motion plan construction (e.g., collision detection or assessment, updating costs of edges in motion planning graphs based on collision detection or assessment, and path search or evaluation) can be executed as described herein (e.g., with reference to FIGS. 4 and 5) and in the references incorporated herein by reference. The collision detection or assessment may perform collision detection or assessment using various structures and techniques described elsewhere herein. Application programs 238 may additionally include one or more machine-readable and machine-executable instructions that cause the processor(s) 222 to perform other operations, for instance optionally handling perception data (captured via sensors). Application programs 238 may additionally include one or more machine-executable instructions that cause the processor(s) 212 to perform various other methods described herein and in the references incorporated herein by reference.

In various embodiments, one or more of the operations described above may be performed by one or more remote processing devices or computers, which are linked through a communications network (e.g., network 210) via network interface 227.

While shown in FIG. 2 as being stored in the system memory 224*a*, the operating system 236, application programs 238, other programs/modules 240, and program data 242 can be stored on other nontransitory computer- or processor-readable media, for example drive(s) 224*b*.

The motion planner 204*a* of the robot control system 200*a* may include dedicated motion planner hardware or may be implemented, in all or in part, via the processor(s) 222 and processor-executable instructions stored in the system memory 224*a* and/or drive 224*b*.

The motion planner 204*a* may include or implement a motion converter 250, a collision detector 252, a cost setter 254 and a path analyzer 256.

The motion converter 250 converts motions of other ones of the robots into representations of obstacles. The motion converter 250 receives the motion plans 204*b* or other representations of motion from other motion planners 200*b*. The motion converter 250 then determines an area or volume corresponding to the motion(s). For example, the motion converter can convert the motion to a corresponding swept volume, that is a volume swept by the corresponding robot or portion thereof in moving or transitioning between poses as represented by the motion plan. Advantageously, the motion planner 204*a* may simply queue the obstacles (e.g., swept volumes), and may not need to determine, track or indicate a time for the corresponding motion or swept volume. While described as a motion converter 250 for a given robot 202 converting the motions of other robots 202 to obstacles, in some implementations the other robots 202 may provide the obstacle representation (e.g., swept volume) of a particular motion to the given robot 202.

The collision detector 252 performs collision detection or analysis, determining whether a transition or motion of a given robot 202 or portion thereof will result in a collision with an obstacle. As noted, the motions of other robots may advantageously be represented as obstacles. Thus, the collision detector 252 can determine whether a motion of one robot will result in collision with another robot that moves through the shared workspace.

In some implementations, collision detector 252 implements software based collision detection or assessment, for example performing a bounding box-bounding box collision assessment or assessing based on a hierarchy of geometric (e.g., spheres) representation of the volume swept by the robots 202 or portions thereof during movement. In some implementations, the collision detector 252 implements hardware based collision detection or assessment, for example employing a set of dedicated hardware logic circuits to represent obstacles and streaming representations of motions through the dedicated hardware logic circuits. In hardware based collision detection or assessment, the collision detector can employ one or more configurable arrays of circuits, for example one or more FPGAs 258, and may optionally produce Boolean collision assessments.

The cost setter 254 can set or adjust a cost of edges in a motion planning graph, based at least in part on the collision detection or assessment. For example, the cost setter 254 can set a relatively high cost value for edges that represent transitions between states or motions between poses that result or would likely result in collision. Also for example, the cost setter 254 can set a relatively low cost value for edges that represent transitions between states or motions between poses that do not result or would likely not result in collision. Setting cost can include setting a cost value that is logically associated with a corresponding edge via some data structure (e.g., field, pointer, table).

The path analyzer 256 may determine a path (e.g., optimal or optimized) using the motion planning graph with the cost values. For example, the path analyzer 256 may constitute a least cost path optimizer that determines a lowest or relatively low cost path between two states, configurations or poses, the states, configurations or poses which are represented by respective nodes in the motion planning graph. The path analyzer 256 may use or execute any variety of path finding algorithms, for example lowest cost path finding algorithms, taking into account cost values associated with each edge which represent likelihood of collision.

Various algorithms and structures to determine the least cost path may be used, including those that implement the Bellman-Ford algorithm, but others may be used, including, but not limited to, any such process in which the least cost path is determined as the path between two nodes in the motion planning graph 208 such that the sum of the costs or weights of its constituent edges is minimized. This process improves the technology of motion planning for a robot 102, 202 by using a motion planning graph which represents motions of other robots as obstacles and collision detection to increase the efficiency and response time to find the "best" path to perform a task without collisions.

The motion planner 204a may optionally include a pruner 260. The pruner 260 may receive information that represents completion of motions by other robots, the information denominated herein as motion completed messages 209. Alternatively, a flag could be set to indicate completion. In response, the pruner 260 may remove an obstacle or portion of an obstacle that represents the now completed motion. That may allow generation of a new motion plan for a given robot, which may be more efficient or allow the given robot to attend to performing a task that was otherwise previously prevented by the motion of another robot. This approach advantageously allows the motion converter 250 to ignore timing of motions when generating obstacle representations for motions, while still realizing better throughput than using other techniques. The motion planner 204a may additionally send a signal, prompt or trigger to cause the collision detector 252 to perform a new collision detection or assessment given the modification of the obstacles to produce an updated motion planning graph in which the edge weights or costs associated with edges have been modified, and to cause the cost setter 254 and path analyzer 256 to update cost values and determine a new or revised motion plan accordingly.

The motion planner 204a may optionally include an environment converter 263 that converts output (e.g., digitized representations of the environment) from optional sensors 262 (e.g., digital cameras) into representations of obstacles. Thus, the motion planner 204a can perform motion planning that takes into account transitory objects in the environment, for instance people, animals, etc.

The processor(s) 212 and/or the motion planner 204a may be, or may include, any logic processing units, such as one or more central processing units (CPUs), digital signal processors (DSPs), graphics processing units (GPUs), application-specific integrated circuits (ASICs), field programmable gate arrays (FPGAs), programmable logic controllers (PLCs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. The construction and operation of the various structure shown in FIG. 2 may implement or employ structures, techniques and algorithms described in or similar to those described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; and/or U.S. Patent Application No. 62/616, 783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS".

Although not required, many of the implementations will be described in the general context of computer-executable instructions, such as program application modules, objects, or macros stored on computer- or processor-readable media and executed by one or more computer or processors that can perform obstacle representation, collision assessments, and other motion planning operations.

Motion planning operations may include, but are not limited to, generating or transforming one, more or all of: a representation of the robot geometry based on a geometric model 112 (FIG. 1), tasks 114 (FIG. 1), and the representation of volumes (e.g. swept volumes) occupied by robots in various states or poses and/or during movement between states or poses into digital forms, e.g., point clouds, Euclidean distance fields, data structure formats (e.g., hierarchical formats, non-hierarchical formats), and/or curves (e.g., polynomial or spline representations). Motion planning operations may optionally include, but are not limited to, generating or transforming one, more or all of: a representation of the static or persistent obstacles 118 (FIG. 1) and/or the perception data representative of static or transient obstacles 120 (FIG. 1) into digital forms, e.g., point clouds, Euclidean distance fields, data structure formats (e.g., hierarchical formats, non-hierarchical formats), and/or curves (e.g., polynomial or spline representations).

Motion planning operations may include, but are not limited to, determining or detecting or predicting collisions for various states or poses of the robot or motions of the robot between states or poses using various collision assessment techniques or algorithms (e.g., software based, hardware based).

In some implementations, motion planning operations may include, but are not limited to, determining one or more motion planning graphs, motion plans or road maps; storing the determined planning graph(s), motion plan(s) or road map(s), and/or providing the planning graph(s), motion plan(s) or road map(s) to control operation of a robot.

In one implementation, collision detection or assessment is performed in response to a function call or similar process, and returns a Boolean value thereto. The collision detector 252 may be implemented via one or more field programmable gate arrays (FPGAs) and/or one or more application specific integrated circuits (ASICs) to perform the collision detection while achieving low latency, relatively low power consumption, and increasing an amount of information that can be handled.

In various implementations, such operations may be performed entirely in hardware circuitry or as software stored in a memory storage, such as system memory 224a, and executed by one or more hardware processors 222, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

Various aspects of perception, planning graph construction, collision detection, and path search that may be employed in whole or in part are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; and U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES". Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a motion planning graph) into the processor (e.g., FPGA), and each edge in the roadmap corresponds to a non-reconfigurable Boolean circuit of the processor. The design in which the planning graph is "baked in" to the processor, poses a problem of having limited processor circuitry to store multiple or large planning graphs and is generally not reconfigurable for use with different robots.

One solution provides a reconfigurable design that places the planning graph information into memory storage. This approach stores information in memory instead of being baked into a circuit. Another approach employs templated reconfigurable circuits in lieu of memory.

As noted above, some of the information (e.g., robot geometric models) may be captured, received, input or provided during a configuration time, that is before run time. The received information may be processed during the configuration time to produce processed information (e.g., motion planning graphs) to speed up operation or reduce computation complexity during runtime.

During the runtime, collision detection may be performed for the entire environment, including determining, for any pose or movement between poses, whether any portion of the robot will collide or is predicted to collide with another portion of the robot itself, with other robots or portions thereof, with persistent or static obstacles in the environment, or with transient obstacles in the environment with unknown trajectories (e.g., people).

Figure 3:
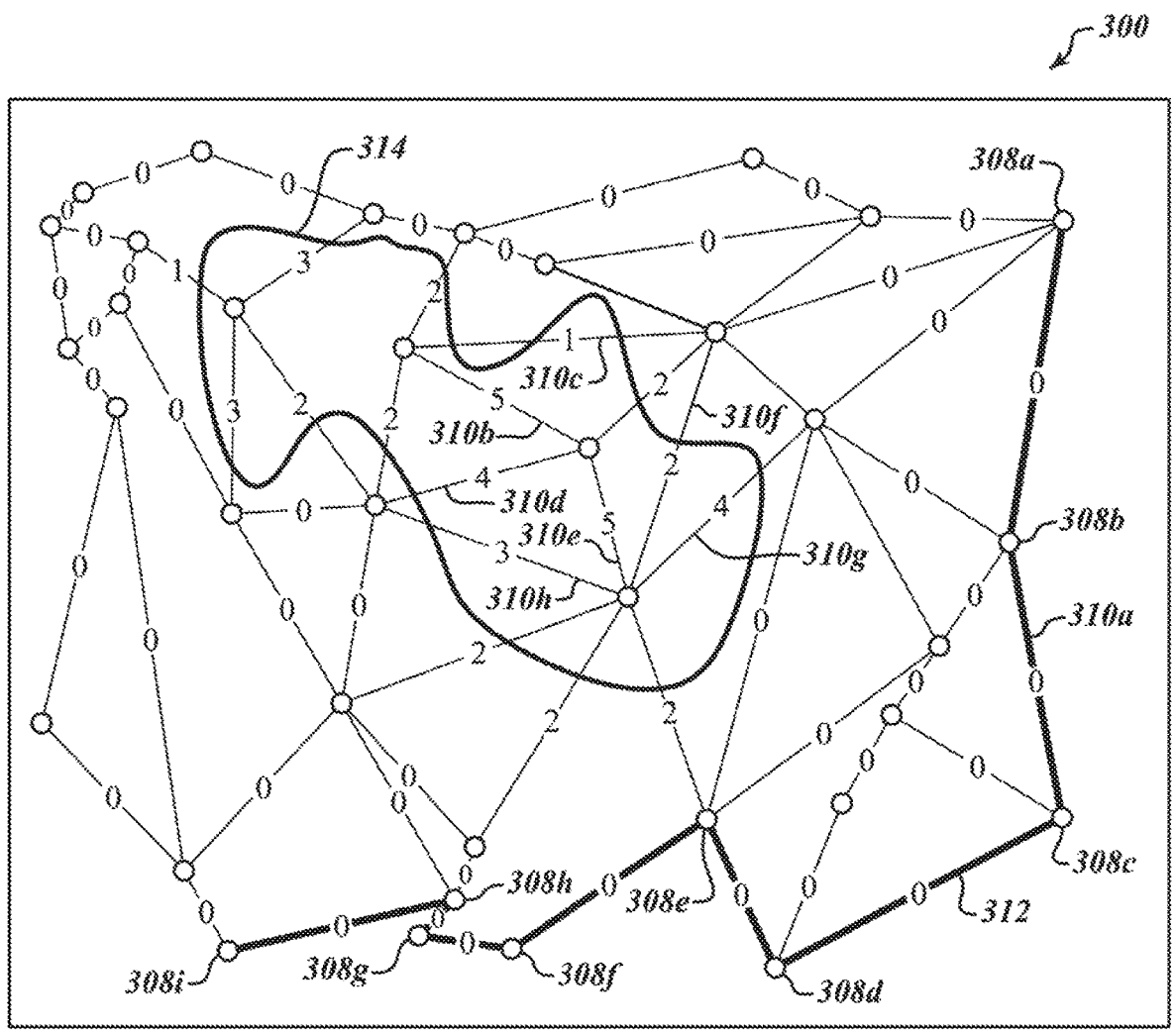
FIG. 3 is an example motion planning graph of a C-space for a robot that operates in a shared workspace, according to one illustrated implementation.

FIG. 3 shows an example motion planning graph 300 for the robot 102 (FIG. 1), 202 (FIG. 2) in the case where the goal of the robot 102, 202 is to perform a task while avoiding collisions with static obstacles and dynamic obstacles, the obstacles which can include other robots operating in a shared workspace. The planning graph 300 respectively comprises a plurality of nodes 308a-308i (represented in the drawing as open circles) connected by edges 310a-310h, (represented in the drawing as straight lines between pairs of nodes). Each node represents, implicitly or explicitly, time and variables that characterize a state of the robot 102, 202 in the configuration space of the robot 102, 202. The configuration space is often called C-space and is the space of the states or configurations or poses of the robot 102, 202 represented in the planning graph 300. For example, each node may represent the state, configuration or pose of the robot 102, 202 which may include, but is not limited to, a position, orientation or pose (i.e., position and orientation). The state, configuration or pose may, for example, be represented by a set of joint positions and joint angles/rotations (e.g., joint poses, joint coordinates) for the joints of the robot 102, 202.

The edges in the planning graph 300 represent valid or allowed transitions between these states, configurations or poses of the robot 102, 202. The edges of planning graph 300 do not represent actual movements in Cartesian coordinates, but rather represent transitions between states, configurations or poses in C-space. Each edge of planning graph 300 represents a transition of a robot 102, 202 between a respective pair of nodes. For example, edge 310a represents a transition of a robot 102, 202, between two nodes. In particular, edge 310a represents a transition between a state of the robot 102, 202 in a particular configuration associated with node 308b and a state of the robot 102, 202 in a particular configuration associated with node 308c. For example, robot 102, 202 may currently be in a particular configuration associated with node 308a. Although the nodes are shown at various distances from each other, this is for illustrative purposes only and this is no relation to any physical distance. There is no limitation on the number of nodes or edges in the planning graph 300, however, the more nodes and edges that are used in the planning graph 300, the more accurately and precisely the motion planner may be able to determine the optimal path according to one or more states, configurations or poses of the robot 102, 202 to carry out a task since there are more paths to select the least cost path from.

Each edge is assigned or associated with a cost value. The cost value may represent a collision assessment with respect to a motion that is represented by the corresponding edge.

Typically, it is desirable for robot 102, 202 to avoid certain obstacles, for example other robots in a shared workspace. In some situations, it may be desirable for robot 102, 202 to contact or come in close proximity to certain objects in the shared workspace, for example to grip or move an object or work piece. FIG. 3 shows a planning graph 300 used by a motion planner to identify a path for robot 102, 202 in the case where a goal of the robot 102, 202 is to avoid collision with one or more obstacles while moving through a number of poses in carrying out a task (e.g., picking and placing an object).

Obstacles may be represented digitally, for example, as bounding boxes, oriented bounding boxes, curves (e.g., splines), Euclidean distance field, or hierarchy of geometric entities, whichever digital representation is most appropriate for the type of obstacle and type of collision detection that will be performed, which itself may depend on the specific hardware circuitry employed. In some implementations, the swept volumes in the roadmap for the primary agent 102 are precomputed. Examples of collision assessment are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; U.S. Patent Application 62/722,067, filed Aug. 23, 2018 entitled "COLLISION DETECTION USEFUL IN MOTION PLANNING FOR ROBOTICS"; and in International Patent Application Publication No. WO 2016/122840, filed Jan. 5, 2016, entitled "SPECIALIZED ROBOT MOTION PLANNING HARDWARE AND METHODS OF MAKING AND USING SAME."

The motion planner or a portion thereof (e.g., collision detector 252, FIG. 2) determines or assesses a likelihood or probability that a motion or transition (represented by an edge) will result in a collision with an obstacle. In some instances, the determination results in a Boolean value, while in others the determination may be expressed as a probability.

For nodes in the planning graph 300 where there is a probability that direct transition between the nodes will cause a collision with an obstacle, the motion planner (e.g., cost setter 254, FIG. 2) assigns a cost value or weight to the edges of the planning graph 300 transitioning between those nodes (e.g., edges 310a, 310b, 310c, 310d, 310e, 310f, 310g, 310h) indicating the probability of a collision with the obstacle. In the example shown in FIG. 3, an area of relatively high probability is denoted as graph portion 314, but does not correspond to a physical area.

For example, the motion planner may, for each of a number of edges of the planning graph 300 that has a respective probability of a collision with an obstacle below a defined threshold probability of a collision, assign a cost value or weight with a value equal or close to zero. In the present example, the motion planner has assigned a cost value or weight of zero to those edges in the planning graph 300 which represent transitions or motions of the robot 102, 202 that do not have any or have very little probability of a collision with an obstacle. For each of a number of edges of the planning graph 300 with a respective probability of a collision with an obstacle in the environment above the defined threshold probability of a collision, the motion planner assigns a cost value or weight with a value substantially greater than zero. In the present example, the motion planner has assigned a cost value or weight of greater than zero to those edges in the planning graph 300 which have a relatively high probability of collision with an obstacle. The particular threshold used for the probability of collision may vary. For example, the threshold may be 40%, 50%, 60% or lower or higher probability of collision. Also, assigning a cost value or weight with a value greater than zero may include assigning a weight with a magnitude greater than zero that corresponds with the respective probability of a collision. For example, as shown in the planning graph 300, the motion planner has assigned a cost value or weight of 5 to edges 310f and 310i that have a higher probability of collision, but has assigned a cost value or weight with a lower magnitude of 1 to edges 310p and 310g, which the motion planner determined have a much lower probability of collision. In other implementations, the cost values or weights may present a binary choice between collision and no collision, there being only two cost values or weights to select from in assigning cost values or weights to the edges.

The motion planner may assign, set or adjust cost values or weights of each edge based on factors or parameters in addition to probability of collision.

After the motion planner sets a cost value or weight representing a probability of collision of the robot 102, 202 with an obstacle based at least in part on the collision assessment, the motion planner (e.g., path analyzer 256, FIG. 2) performs an optimization to identify a path 312 in the resulting planning graph 300 that provides a motion plan for the robot 102, 202 as specified by the path with no or a relatively low potential of a collision with obstacles including other robots operating in a shared workspace.

In one implementation, once all edge costs of the planning graph 300 have been assigned or set, the motion planner (e.g., path analyzer 256, FIG. 2) may perform a calculation to determine a least cost path to or toward a goal state represented by a goal node. For example, the path analyzer 256 (FIG. 2) may perform a least cost path algorithm from the current state of the robot 102, 202 in the planning graph 300 to possible states, configurations or poses. The least cost (closest to zero) path in the planning graph 300 is then selected by the motion planner. As explained above, cost may reflect not only probability of collision, but also other factors or parameters. In the present example, a current state, configuration or pose of the robot 102, 202 in the planning graph 300 is at node 308a, and the path is depicted as path 312 (bolded line path comprising segments extending from node 308a through node 308i) in the planning graph 300.

Although shown as a path in planning graph 300 with many sharp turns, such turns do not represent corresponding physical turns in a route, but logical transitions between states, configurations or poses of the robot 102, 202. For example, each edge in the identified path 312 may represent a state change with respect to physical configuration of the robot 102, 202 in the environment, but not necessarily a change in direction of the robot 102, 202 corresponding to the angles of the path 312 shown in FIG. 3.

Figure 4:
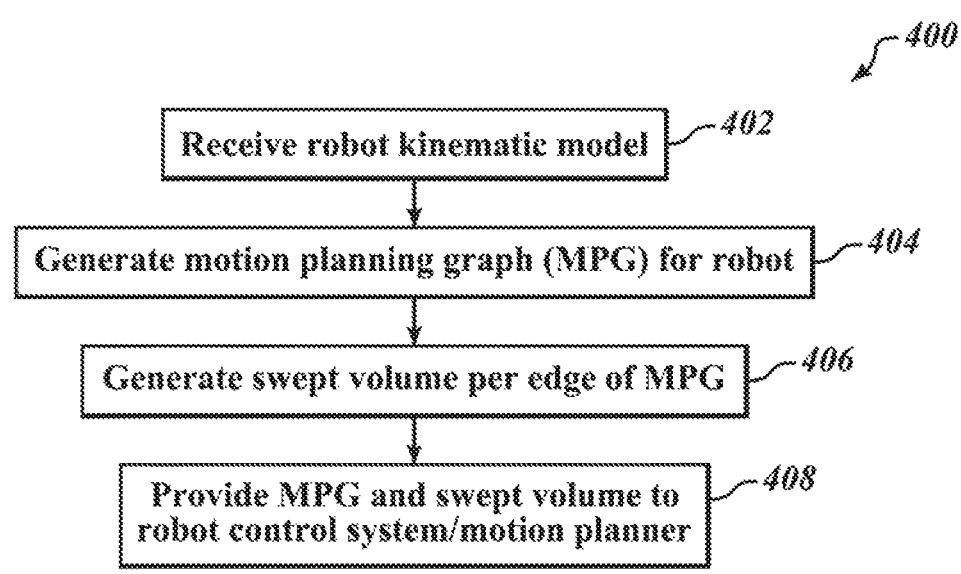
FIG. 4 is a flow diagram showing a method of operation in a processor-based system to produce motion planning graphs and swept volumes, according to at least one illustrated implementation.

FIG. 4 shows a method of operation 400 in a processor-based system to produce motion planning graphs and swept volumes, according to at least one illustrated implementation. The method 400 may be executed before a runtime, for example during a configuration time. The method 400 may be executed by a processor-based system (e.g., server computer) that is separate and distinct, and possibly remote, from one or more robots and/or one or more robot control systems.

At 402, a processor-based system receives one or more robot kinematic models. The robot kinematic models provide a specification of the geometry of respective robots.

At 404, the processor-based system generates a motion planning graph for a robot based on the respective robot kinematic model. The motion planning graph represents each state, configuration or pose of the robot as a respective node, and represents valid transitions between pairs of states, configurations or poses as edges which connect the corresponding pair of nodes. While described in terms of a graph, the motion planning graph does not necessarily need to be represented or stored as a conventional graph, but rather can be represented, for example logically or in a memory circuit or computer processor, using any variety of data structures (e.g., records and fields, tables, linked lists, pointers, trees).

At 406, the processor-based system generates a swept volume for each edge of the motion planning graph. The swept volume represents a volume swept by the robot or a portion thereof in executing a motion or transition that corresponds to the respective edge. The swept volume may be represented in any of a large variety of forms, for example as voxels, a Euclidean distance field, a hierarchy of spheres or other geometric objects.

At 408, the processor-based system provides the motion planning graphs and/or the swept volumes to a robot control system and/or motion planner. The processor-based system may provide the motion planning graphs and/or the swept volumes via a non-proprietary communications channel (e.g., Ethernet). In some implementations, various robots from different robot manufacturers may operate in a shared workspace. In some implementations, various robot manufacturers may operate proprietary processor-based systems (e.g., server computers) that generate the motion planning graphs and/or the swept volumes for the various robots that the robot manufacturers produce. Each of the robot manufacturers can provide the respective motion planning graphs and/or swept volumes for use by the robot controllers or motion planners.

Figure 5A:
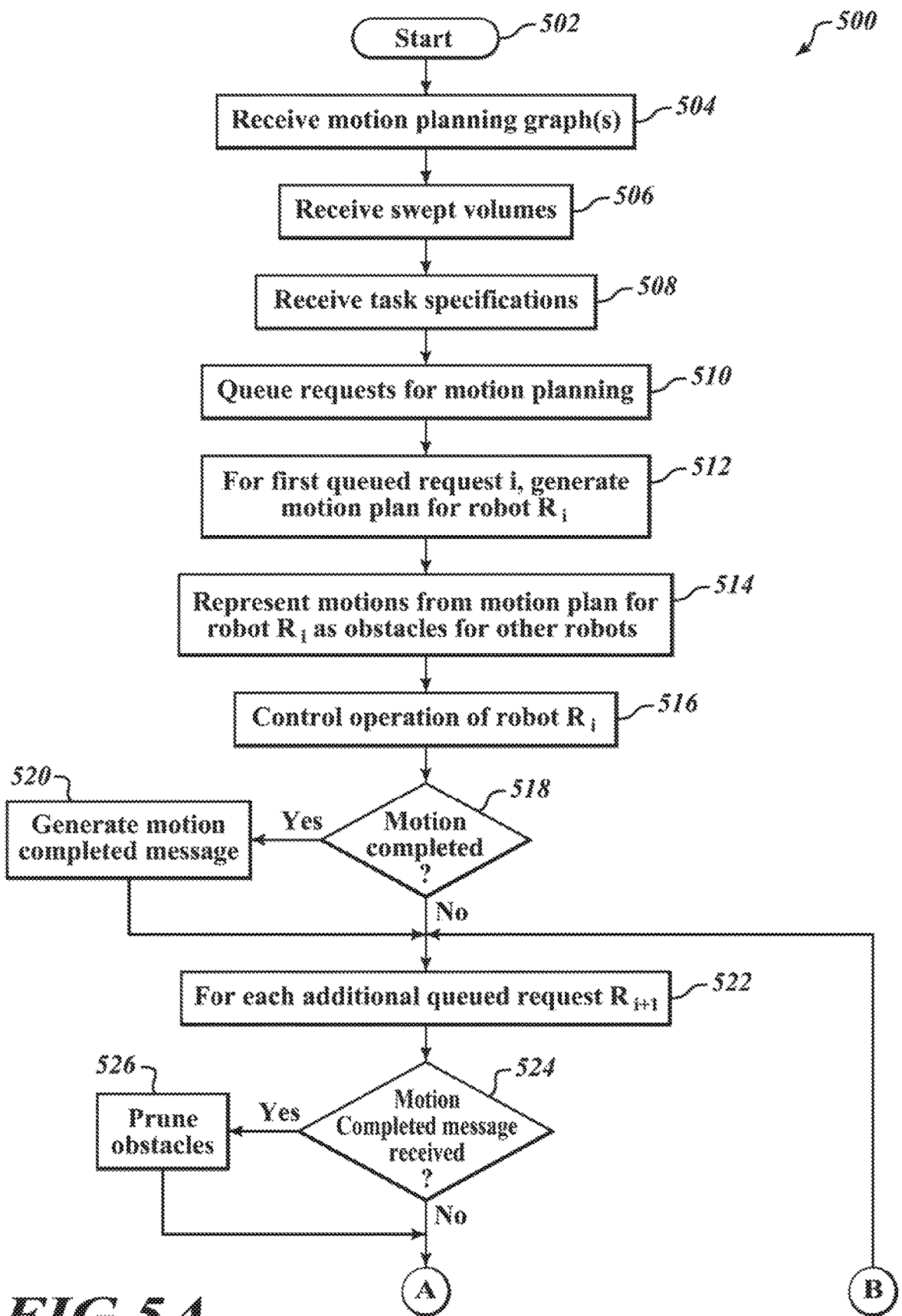
FIGS. 5A and 5B are a flow diagram showing a method of operation in a processor-based system to produce motion plans and, optionally control a plurality of robots that operate in a shared workspace, according to one illustrated implementation.
Figure 5B:
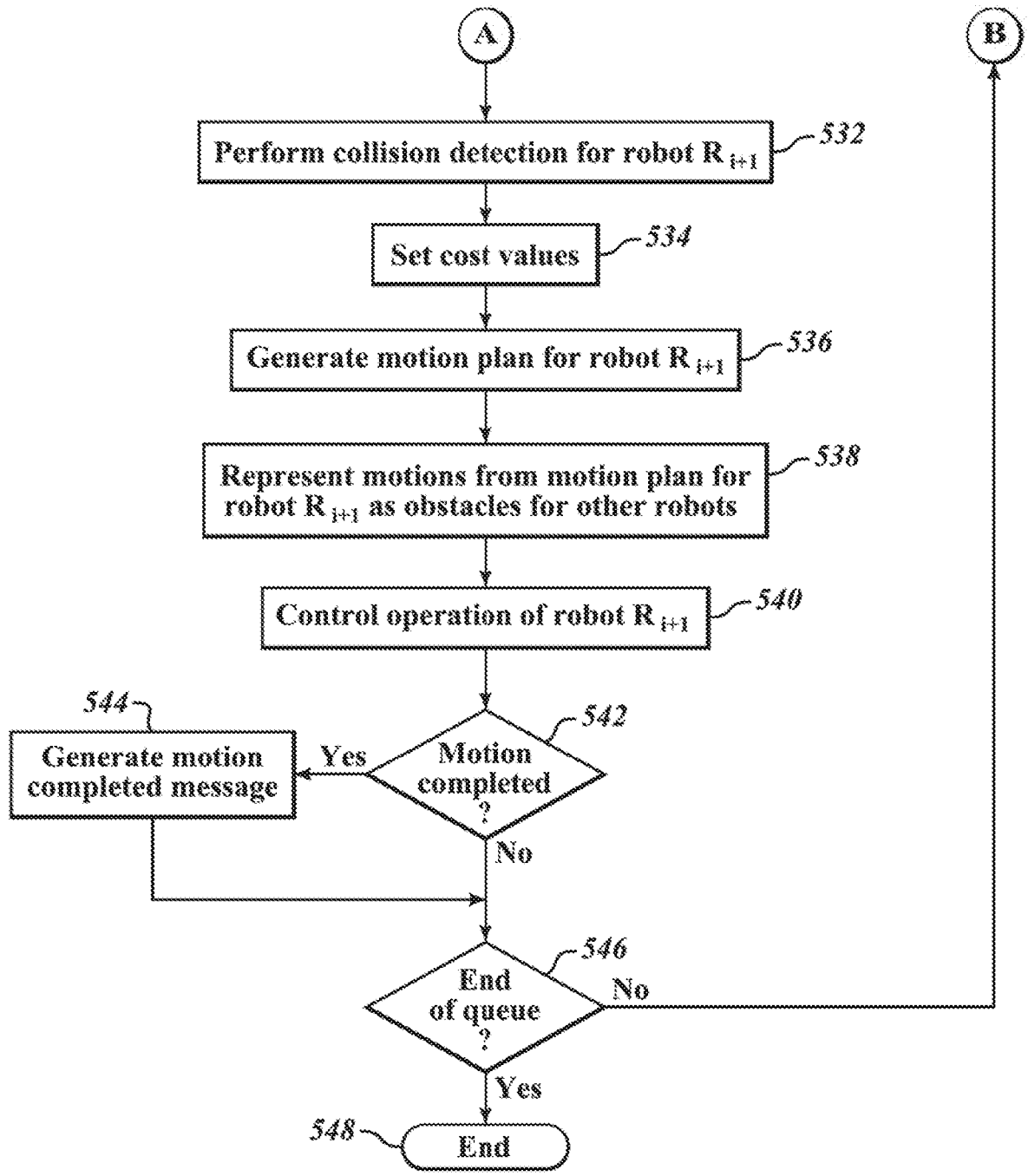

FIGS. 5A and 5B show a method of operation 500 in a processor-based system to produce motion plans and, optionally control a plurality of robots that operate in a shared workspace, according to at least one illustrated implementation. The method 500 may be executed during a runtime, for example following a configuration time. The method 500 may be executed by one or more processor-based systems that take the form of one or more robot control systems. The robot control systems may, for example, be co-located or "on-board" respective ones of the robots.

The method 500 starts at 502, for example in response to a power ON of a robot and/or robot control system, in response to a call or invocation from a calling routine, or in response to receipt of a task.

At 504, the processor-based system optionally receives motion planning graph(s) for one or more robots. For example, the processor-based system may receive the motion planning graph(s) from another processor-based system, which generated the motion planning graph(s) during a configuration time. The motion planning graphs represent each state, configuration or pose of the robot as a respective node, and represent valid transitions between pairs of states, configurations or poses as edges which connect the corresponding nodes. While described in terms of a graph, each motion planning graph does not necessarily need to be represented or stored as a conventional graph, but rather can be represented, for example logically or in a memory circuit or computer processor, using any variety of data structures (e.g., records and fields, tables, linked lists, pointers, trees).

At 506, the processor-based system optionally receives a set of swept volumes for one or more robots. For example, the processor-based system may receive the set of swept volumes from another processor-based system, which generated the motion planning graph(s) during a configuration time. Alternatively, the processor-based system may generate the set of swept volumes itself, for example based on the motion planning graphs. The swept volumes represent respective volumes swept by the robot or a portion thereof in executing a motion or transition that corresponds to a respective edge. The swept volumes may be represented in any of a large variety of forms, for example as voxels, a Euclidean distance field, a hierarchy of spheres or other geometric objects.

At 508, the processor-based system receives a number of tasks, for example in the form of task specifications. The task specifications specify robot tasks to be performed or carried out by the robots. The task specifications may, for example, specify that a robot is to move from a first position to second position, grasp an object at the second position, move the object to a third position and release the object at the third position. The task specifications may take a variety of forms, for example a high level specification (e.g., prose and syntax) which requires parsing to a lower level specification. The task specifications may take the form of low level specifications, for example specifying a set of joint positions and joint angles/rotations (e.g., joint poses, joint coordinates).

At 510, the processor-based system optionally receives or generates a collection or set of requests for motion planning for each of a plurality of robots $R_1$-$R_N$ that operate in the shared workspace. The collection or set of requests are denominated as a list or queue of requests, although such does not necessarily imply that an order or arrangement of the tasks in the list or queue corresponds to an order in which the tasks should or will be performed or executed or processed. Requests can be generated based on tasks to be carried out by each robot. In some instances, the requests may be ordered relative to one another in the queue of requests, for example where a first robot is supposed to perform a first motion (e.g., releasing a workpiece at a first location) before a second robot performs a second motion (e.g., grasping the workpiece at the first location).

At 512, for a first queued request i, the processor-based system generates a corresponding motion plan for a corresponding robot (e.g., robot $R_i$). Generating the motion plan may include, for example: performing collision detection or assessment, setting cost values of edges in a motion planning graph for the robot $R_i$ based on the collision detection or assessment, and determining a path using the motion planning graphs with cost values, for instance via a least cost analysis. While this description employs the same counter for the request and the robot that carries out the request, such is simply for ease of understanding. As noted herein, any given request to perform a task may be carried out by any given robot that is capable of performing the respective task. For example, an $i^{th}$ request may be completed by an $i+3^{th}$ robot, for example where the $i+3^{th}$ robot was the robot available at the time that the an $i^{th}$ request is being serviced. Typically, there will be many more tasks than robots, thus any given robot $R_i$ will execute requests other than an $i^{th}$ request in the queue. Thus, there is not necessarily a one-to-one relationship between requests and robots.

At 514, the processor-based system represents the motions from the motion plan for one or more robots (e.g., robot $R_i$) as obstacles for other robots. For example, the processor-based system may queue swept volumes corresponding to each motion as obstacles in an obstacle queue. The swept volumes may have been previously determined or calculated for each edge, and logically associated with each edge in memory via a data structure (e.g., pointer). As previously noted, the swept volumes may be represented in any of a variety of forms for example as voxels, a Euclidean distance field, a hierarchy of spheres or other geometric objects.

At 516, the processor-based system optionally controls an operation of the corresponding robot (e.g., $R_i$) for which the motion plan was generated. For example, the processor-based system may send control signals or drive signals to one or more motion controllers (e.g., motor controllers) to cause one or more actuators to move one or more linkages according to the motion plan.

At 518, the processor-based system optionally determines whether the corresponding motion has been completed. Monitoring completion of motions can advantageously allow the processor-based system to remove obstacles corresponding to the motion from consideration during subsequent collision detection or assessment. The processor-based system may rely on coordinates of the corresponding robot. The coordinates may be based on information from the motion controllers, actuators and/or sensors (e.g., cameras, rotational encoders, Reed switches) to determine whether a given motion has been completed.

At 520, the processor-based system generates or transmits a motion completed message or sets a flag in response to a determination that a given motion has been completed.

At 522, the processor-based system performs an iterative loop for each additional queued request i+1. In each pass of the iterative loop, the processor-based system performs one or more of the acts 524 through 544 described immediately below. While described as an iterative loop, the processor-based system may perform one or more acts of the method 500 for each task or motion planning request in a set, list or queue of tasks or motion planning requests. The motion planning for any given task or motion planning request may be performed with respect to any selected one of the robots, the selection which may be made autonomously by the processor-based system based on one or more criteria, for example as described below with reference to FIG. 6.

At 524, the processor-based system determines whether a motion completed message has been generated or received or flag set.

At 526, the processor-based system prunes one or more obstacles corresponding to the given motion in response to a determination that a motion completed message has been generated or received or flag set. For example, the processor-based system may remove the corresponding obstacle from an obstacle queue. This advantageously allows collision detection or assessment to proceed with the environment cleared of a swept volume that is no longer present as an obstacle. This also advantageously allows motions and corresponding swept volumes to be tracked without the need to track timing of the motions or corresponding swept volumes.

At 532, the processor-based system performs collision detection or assessment for the robot (e.g., $R_{i+1}$). The processor-based system may employ any of the various structures and algorithms described herein or in the materials incorporated by reference herein to perform the collision detection or assessment. Collision detection or assessment may include performing collision detection or assessment for each motion against each obstacle in an obstacle queue.

At 534, the processor-based system sets cost values of edges in the motion planning graph based at least in part on the collision detection or assessment for the robot (e.g., $R_{i+1}$). The processor-based system may employ any of the various structures and algorithms described herein or in the materials incorporated by reference herein to perform the cost value setting, typically setting or adjusting the cost for edges without or with low risk of collision to a relatively low value (e.g., zero), and setting or adjusting the cost for edges that will result in collision or with a high risk of collision to a relatively high value (e.g., one hundred thousand).

At 536, the processor-based system generates a motion plan for the robot (e.g., $R_{i+1}$) based at least in part on the collision detection or assessment. The processor-based system may employ any of the various structures and algorithms described herein or in the materials incorporated by reference herein to generate the motion plan, for example performing a least cost analysis on the motion planning graph with the set cost values.

At 538, the processor-based system represents motions from the motion plan for the current robot (e.g., $R_{i+1}$) as obstacles for other robots. For example, the processor-based system may queue swept volumes corresponding to each motion as obstacles in an obstacle queue. The swept volumes may have been previously determined or calculated for each edge, and logically associated with each edge in memory via a data structure (e.g., field, pointer). As previously noted, the swept volumes may be represented in any of a variety of forms for example as voxels, a Euclidean distance field, a hierarchy of spheres or other geometric objects.

At 540, the processor-based system controls operation of the current robot (e.g., $R_{i+1}$) for which the motion plan was generated. For example, the processor-based system may send control signals or drive signals to one or more motion controllers (e.g., motor controllers) to cause one or more actuators to move one or more linkages.

At 542, the processor-based system optionally determines whether the corresponding motion has been completed. Monitoring completion of motions can advantageously allow the processor-based system to remove obstacles corresponding to the motion from consideration during subsequent collision detection or assessment. The processor-based system may rely on coordinates of the corresponding robot. The coordinates may be based on information from the motion controllers, actuators and/or sensors (e.g., cameras, rotational encoders, Reed switches) to determine whether a given motion has been completed.

At 544, the processor-based system generates or transmits a motion completed message in response to a determination that a given motion has been completed.

At 546, the processor-based system determines whether an end of the queue has been reached. For example, the processor-based system may determine whether there are any motion planning requests remaining in the motion planning request queue, and/or whether all tasks have been completed. In at least some implementations, the set of tasks (e.g., task queue) may be temporarily depleted, with the possibility of new or additional tasks later arriving. In such implementations, the processor-based system may execute a wait loop, checking for new or additional tasks from timeto-time or waiting for a signal indicating a new or additional task is available to be processed and carried out.

The method 500 may terminate at 548. Alternatively, the method 500 may repeat until affirmatively stopped, for example by a power down state or condition. In some implementations, the method 500 may execute as a multi-threaded process on one or more processors.

While the method of operation 500 is described in terms of an ordered flow, the various acts or operations will in many implementations be performed concurrently or in parallel. Often, motion planning for one robot to perform one task may be carried out while one or more robots perform tasks. Thus, the performance of tasks by robots may overlap or be concurrent with or in parallel with the performance of motion planning by one or more motion planners. The performance of tasks by robots may overlap or be concurrent with or in parallel with the performance of tasks by other robots. In some implementations, at least some portion of motion planning for one robot may overlap or be concurrent with or in parallel with at least some portion of motion planning for one or more other robots.

Figure 6:
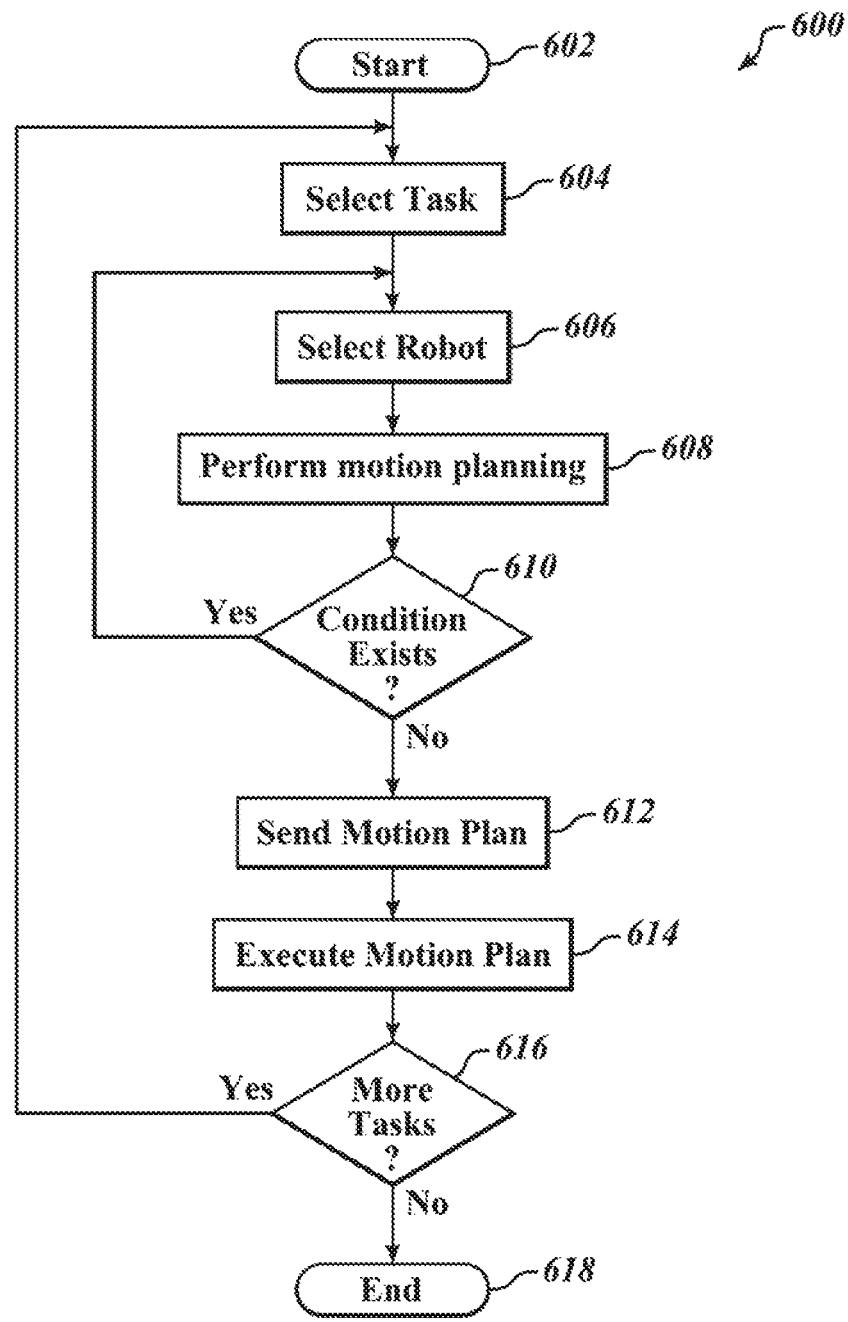
FIG. 6 is a flow diagram showing a method of operation in a processor-based system to produce motion plans and, optionally control a plurality of robots that operate in a shared workspace, according to at least one illustrated implementation.

FIG. 6 shows a method of operation 600 in a processor-based system to produce motion plans and, optionally control a plurality of robots that operate in a shared workspace, according to at least one illustrated implementation. The method 600 may be executed during a runtime, for example following a configuration time. The method 600 may be executed by one or more processor-based systems that take the form of one or more robot control systems. The robot control systems may, for example, be co-located or "on-board" respective ones of the robots. The method 600 may be employed along with the method 500 (FIGS. 5A and 5B).

The method 600 starts at 602, for example in response to a power ON of a robot and/or robot control system, in response to a call or invocation from a calling routine, or in response to receipt of a set or list or queue of tasks.

At 604, a processor-based system selects a task from a set or list or queue of tasks to be performed. The tasks may collectively achieve a goal. For example, tasks may include picking and placing objects, with the goal of sorting a pile of objects into two or more distinct piles of objects of respective types of objects by two or more robots operating in a common workspace.

The processor-based system may select tasks from a set of tasks (e.g., task queue). The tasks may take the form of, or correspond to, motion planning requests, or may give rise to respective motion planning requests depending on the specific system architecture. The tasks in the task queue may, or may not, be ordered. The tasks may be selected based on any one or more criteria, e.g., an order of one task relative to another task to accomplish a goal, a priority of the task relative to other tasks, efficiency (e.g., time to complete goal, energy expenditure, number of movements to complete goal, ability to operate robots in parallel, minimizing wait time of robots) in accomplishing a goal, the availability of a robot suitable to carry out a specific type of task (for instance availability of a robot with a certain type of end-of-arm tool or end effector).

At 606, the processor-based system selects a robot to perform the selected task. The processor-based system may select a robot based on any one or more criteria, e.g., availability of the robot, suitability of the robot to perform the task, lack of suitability of other robots to perform the task or to perform other types of tasks for which the robot is not suitable to perform, existence or absence of a condition (e.g., error condition, low power condition, blocked state condition, wear condition, scheduled service condition).

At 608, the processor-based system performs motion planning for the pair of the selected task and selected robot. For example, the processor-based system may perform motion planning as generally described with reference to method 500 (FIG. 5).

At 610, the processor-based system determines whether a condition exists that would cause performance of the selected task by the selected robot to be skipped or delayed. Conditions may include an error condition that indicates an operational or mechanical error in the selected robot or the respective robot control system. Conditions may include a blocked condition that indicates that a given motion of the robot as indicated by the motion planning is currently blocked or is otherwise unachievable. Conditions may include a low power condition, a wear condition or a scheduled service condition for the selected robot, all indicating that the selected robot may not be able to complete the task at the given time. Conditions may also include a skip condition, in which a given robot or robot control system asserts an override to a task or motion planning request. Additionally or alternatively, the processor-based system may handle expedite conditions, that include an override request that causes a given task or motion planning request to be expedited, moving the given task or motion planning request ahead of other ones of the tasks or motion planning requests in the task or motion planning request queue, or otherwise raising a priority of a task or motion planning request with respect to one or more other tasks or motion planning requests.

In response to determining that a condition exists at 610 that would cause performance of the selected task by the selected robot to be skipped or delayed, the processor-based system returns control to 606 to select a different robot to perform the selected task. Alternatively, control could pass to 604 to select a new task, the previous task remaining in the queue of tasks to be performed or added back to the queue of tasks to be performed. This may facilitate selection of more urgent tasks that may have been added to the queue of tasks in the interim.

In response to determining that a condition does not exist at 610, control passes to 612, where the motion plan for carrying out the selected task is sent to the selected robot. Such can, for example, include providing high level instructions or low level instructions (e.g., motor control instructions) to the selected robot via wired or wireless communications channels.

At 614, the selected robot executes or carries out the motion plan. For example, one or more actuators cause a robotic appendage and associated end-of-arm tool to carry out the task.

At 616, the processor-based system determines whether there are additional tasks or motion planning requests in the set, list, or queue to be serviced. In at least some implementations, the set of tasks (e.g., task queue) may be temporarily depleted, with the possibility of new or additional tasks later arriving. In such implementations, the processor-based system may execute a wait loop, checking for new or additional tasks from time-to-time or waiting for a signal indicating a new or additional task is available to be processed and carried out.

The method 600 may terminate at 618. Alternatively, the method 600 may repeat until affirmatively stopped, for example by a power down state or condition. In some implementations, the method 600 may execute as a multi-threaded process on one or more processors. For example, motion planning for multiple tasks may be performed concurrently.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited to International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. patent application Ser. No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; U.S. Patent Application No. 62/856,548, filed Jun. 3, 2019, entitled "APPARATUS, METHODS AND ARTICLES TO FACILITATE MOTION PLANNING IN ENVIRONMENTS HAVING DYNAMIC OBSTACLES"; and U.S. Patent Application No. 62/865,431, filed Jun. 24, 2019, entitled "MOTION PLANNING FOR MULTIPLE ROBOTS IN SHARED WORKSPACE" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a plurality of robots to operate in a common workspace in which a range of motion of the robots overlap, the method comprising:

generating, by at least one processor, a first motion plan for a robot $R_1$ of the plurality of robots, wherein the first motion plan for the robot $R_1$ is in a digital form;

for each of at least one of the robots $R_i$, from i equals 2 to i equals n where n is a total number of the robots in the plurality of robots and n is an integer that is equal to or greater than 2, representing, by the at least one processor, a number of motions of at least the robot $R_1$ as at least one obstacle, wherein the representation of the number of motions of at least the robot $R_1$ as at least one obstacle is in a digital form;

performing, by the at least one processor, collision detection for at least one motion of at least a portion of the robot $R_i$ with respect to the representation of the at least one obstacle;

generating, by the at least one processor, a first motion plan for the robot $R_i$ based at least in part on the collision detection for the at least one motion of at least the portion of the robot $R_i$, wherein the first motion plan for the robot $R_i$ is in a digital form;

executing, by the at least one processor, the respective first motion plan for a corresponding one of the plurality of robots to control operation of at least one of the robots $R_1$ through $R_n$; and in response to completion of at least one motion by the robot $R_1$, updating, by the at least one processor, a representation of obstacles to eliminate portions corresponding to the completed at least one motion by the robot $R_1$.

2. The method of claim 1, further comprising:

in response to completion of at least one motion by any one or more of the robots $R_2$ through $R_n$, updating, by the at least one processor, a representation of obstacles to eliminate portions corresponding to the completed at least one motion by a respective one of the robots $R_2$ through $R_n$.

3. The method of claim 1, further comprising:

generating, by the at least one processor, a second motion plan for the robot $R_1$ of the plurality of robots;

for each of at least one of the robots $R_i$, from i equals 2 to i equals n where n is a total number of the robots in the plurality of robots and n is an integer that is equal to or greater than 2, representing, by the at least one processor, a number of motions of at least the robot $R_1$ as at least one obstacle;

performing, by the at least one processor, collision detection for at least one motion of at least a portion of the robot $R_i$ with respect to the representation of the at least one obstacle; and generating, by the at least one processor, a second motion plan for the robot $R_i$ based at least in part on the collision detection for the at least one motion of at least the portion of the robot $R_i$; and the method further comprising:

executing, by the at least one processor, the respective second motion plan for the corresponding one of the plurality of robots to control operation of at least one of the robots $R_1$ through $R_n$.

4. The method of claim 3 wherein the generating a first motion plan for the robots $R_1$ through $R_n$ occurs in succession from i equals 1 to i equals n.

5. The method of claim 4 wherein the generating a second motion plan for the robots $R_1$ through $R_n$ occurs in succession from i equals 1 to i equals n.

6. The method of claim 4 wherein the generating a second motion plan for the robots $R_1$ through $R_n$ does not occur in succession from i equals 1 to i equals n.

7. The method of claim 3 wherein executing the respective first motion plan for the corresponding one of the plurality of robots to control operation of at least one of the robots $R_1$ through $R_n$ includes providing signals that cause one robot $R_i$ to move before the robot $R_1$, and wherein:
the updating, by the at least one processor, a representation of obstacles to eliminate portions corresponding to the completed at least one motion by the robot $R_i$ in response to completion of at least one motion by the robot $R_i$ occurs before performing the generating a second motion plan for the robot $R_1$ of the plurality of robots.

8. The method of claim 1, further comprising:
generating, by the at least one processor, a second motion plan for the robot $R_1$ of the plurality of robots;
for some but not all of two or more robots $R_i$, from i equals 2 to i equals n where n is a total number of the robots in the plurality of robots and n is an integer that is equal to or greater than 3,
representing, by the at least one processor, a number of motions of at least the robot $R_1$ as at least one obstacle;
performing, by the at least one processor, collision detection for at least one motion of at least a portion of the robot $R_i$ with respect to the representation of the at least one obstacle; and
generating, by the at least one processor, a second motion plan for the robot $R_i$ based at least in part on the collision detection for the at least one motion of at least the portion of the robot $R_i$; and the method further comprising:
executing, by the at least one processor, the respective second motion plan for the corresponding one of the plurality of robots to control operation of at least one of the robots $R_1$ through $R_n$.

9. The method of claim 8 wherein the generating a second motion plan for one of the robots $R_2$ through $R_n$ is skipped.

10. The method of claim 8 wherein the generating a second motion plan for one of the robots $R_2$ through $R_n$ is skipped in response to a respective one of the robots $R_2$ through $R_n$ being blocked from movement by another one of the robots $R_2$ through $R_n$.

11. The method of claim 8 wherein the generating a second motion plan for one of the robots $R_2$ through $R_n$ is skipped in response to a respective one of the robots $R_2$ through $R_n$ having an error state that indicates an error condition has occurred.

12. The method of claim 1 wherein representing a number of motions of at least the robot $R_1$ as at least one obstacle includes, for at least one robot $R_{i+1}$, representing the motion of two or more of the robots $R_1$ through $R_i$ as obstacles before performing the collision detection for the at least one motion of the robot $R_{i+1}$.

13. The method of claim 12 wherein representing the motion of two or more of robots $R_1$ through $R_i$ as obstacles before performing the collision detection for the at least one motion of the robot $R_{i+1}$ includes: using a set of swept volumes previously computed at a pre-runtime, the swept volumes each of which represents a respective volume swept by at least a portion of the respective one of the robots $R_1$ through $R_i$ as the portion of the respective one of the robots $R_1$ through $R_i$ moves along a trajectory represented by the respective motion.

14. The method of claim 12, further comprising:
receiving, by the at least one processor, a set of swept volumes previously computed at a pre-runtime, the swept volumes each of which represents a respective volume swept by at least a portion of the respective one of the robots $R_1$ through $R_i$ as the portion of the respective one of the robots $R_1$ through $R_i$ moves along a trajectory represented by the respective motion.

15. The method of claim 12 wherein representing the motion of two or more of the robots $R_1$ through $R_i$ as obstacles before performing the collision detection for the at least one motion of the robot $R_{i+1}$ includes: representing the motion of two or more of the robots $R_1$ through $R_i$ as at least one of: an occupancy grid, a hierarchical tree or a Euclidean distance field.

16. The method of claim 1 wherein representing each of the motions of at least the robot $R_1$ as at least one obstacle includes using a respective swept volume to represent the respective motion, the swept volume corresponding to a volume swept by at least a portion of at least the robot $R_1$ during the respective motion and wherein performing collision detection for at least one motion of at least a portion of the robot $R_i$ with respect to the representation of the at least one obstacle includes performing collision detection using a representation of the swept volume which was previously computed at a pre-runtime, the pre-runtime which occurs before a runtime, the runtime being a time during which at least one of the robots performs tasks.

17. The method of claim 1, further comprising:
for each of the robots $R_1$ through $R_n$ of the plurality of robots, representing, by the at least one processor, the respective robot via a respective motion planning graph, each motion planning graph comprising a plurality of nodes and edges, the nodes which represent respective states of the respective robot and the edges which represent valid transitions between respective states represented by the respective ones of a respective pair of nodes connected by the edge.

18. A system to control a plurality of robots to operate in a common workspace in which a range of motion of the robots overlap, the system comprising:
at least one processor; and
at least one nontransitory storage medium communicatively coupled to the at least one processor and that stores processor-executable instructions which, when executed by the at least one processor, cause the at least one processor to:
generate, by the at least one processor, a first motion plan for a robot $R_1$ of the plurality of robots;
for each of at least one of the robots $R_i$, from i equals 2 to i equals n where n is a total number of the robots in the plurality of robots and n is an integer that is equal to or greater than 2,
represent, by the at least one processor, a number of motions of at least the robot $R_1$ as at least one obstacle;
perform collision detection, by the at least one processor, for at least one motion of at least a portion of the robot $R_i$ with respect to the representation of the at least one obstacle;
generate, by the at least one processor, a first motion plan for the robot $R_i$ based at least in part on the collision detection for the at least one motion of at least the portion of the robot $R_i$;

executing, by the at least one processor, a respective first motion plan for the corresponding one of the plurality of robots to control operation of at least one of the robots $R_1$ through $R_n$; and in response to completion of at least one motion by the robot $R_1$, update a representation of obstacles, by the at least one processor, to eliminate portions corresponding to the completed at least one motion by the robot $R_1$.

19. The system of claim 18 wherein, when executed by the at least one processor, the processor-executable instructions cause the at least one processor further to:

in response to completion of at least one motion by any one or more of the robots $R_2$ through $R_n$, update a representation of obstacles to eliminate portions corresponding to the completed at least one motion by a respective one of the robots $R_2$ through $R_n$.

20. The system of claim 18 wherein, when executed by the at least one processor, the processor-executable instructions cause the at least one processor further to:

generate a second motion plan for the robot $R_1$ of the plurality of robots;

for each of at least one of the robots $R_i$, from i equals 2 to i equals n where n is a total number of the robots in the plurality of robots and n is an integer that is equal to or greater than 2, represent a number of motions of at least the robot $R_1$ as at least one obstacle;

perform collision detection for at least one motion of at least a portion of the robot $R_i$ with respect to the representation of the at least one obstacle; and generate a second motion plan for the robot $R_i$ based at least in part on the collision detection for the at least one motion of at least the portion of the robot $R_i$; and further:

provide signals to control operation of at least one of the robots $R_1$ through $R_n$ based at least in part on the respective second motion plan for the corresponding one of the plurality of robots.

21. The system of claim 18 wherein, when executed by the at least one processor, the processor-executable instructions cause the at least one processor further to:

generate a second motion plan for the robot $R_1$ of the plurality of robots;

for some but not all of two or more robots $R_i$, from i equals 2 to i equals n where n is a total number of the robots in the plurality of robots and n is an integer that is equal to or greater than 3, represent a number of motions of at least the robot $R_1$ as at least one obstacle;

perform collision detection for at least one motion of at least a portion of the robot $R_i$ with respect to the representation of the at least one obstacle;

generate a second motion plan for the robot $R_i$ based at least in part on the collision detection for the at least one motion of at least the portion of the robot $R_i$; and execute, by the at least one processor the respective second motion plan for the corresponding one of the plurality of robots to control operation of at least one of the robots $R_1$ through $R_n$, and wherein:

the generation of a second motion plan for one of the robots $R_2$ through $R_n$ is skipped in response to a respective one of the robots $R_2$ through the $R_n$ being blocked from movement by another one of the robots $R_2$ through $R_n$.

* * * * *